United States Patent
Tateishi

(10) Patent No.: US 12,432,439 B2
(45) Date of Patent: Sep. 30, 2025

(54) LINE-OF-SIGHT DETECTING APPARATUS, IMAGE PICKUP APPARATUS, LINE-OF-SIGHT DETECTING METHOD, AND STORAGE MEDIUM

(71) Applicant: CANON KABUSHIKI KAISHA, Tokyo (JP)

(72) Inventor: Tomohiro Tateishi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 266 days.

(21) Appl. No.: 18/467,257

(22) Filed: Sep. 14, 2023

(65) Prior Publication Data

US 2024/0114228 A1    Apr. 4, 2024

(30) Foreign Application Priority Data

Oct. 4, 2022 (JP) .................................. 2022-160515

(51) Int. Cl.
- *H04N 23/611* (2023.01)
- *G06T 7/70* (2017.01)
- *G06T 7/80* (2017.01)

(52) U.S. Cl.
CPC ............. *H04N 23/611* (2023.01); *G06T 7/70* (2017.01); *G06T 7/80* (2017.01)

(58) Field of Classification Search
CPC ................................ H04N 23/611; G06T 7/80
See application file for complete search history.

(56) References Cited

U.S. PATENT DOCUMENTS

| | | | | |
|---|---|---|---|---|
| 2022/0353426 | A1* | 11/2022 | Horie | H04N 23/63 |
| 2023/0092593 | A1* | 3/2023 | Nakamichi | G06T 7/73 |
| | | | | 382/103 |
| 2023/0098675 | A1* | 3/2023 | Hayashi | G06V 40/193 |
| | | | | 600/558 |
| 2023/0237846 | A1* | 7/2023 | Andersson | H04N 5/265 |
| | | | | 348/78 |

FOREIGN PATENT DOCUMENTS

| | | |
|---|---|---|
| JP | 2002-336202 A | 11/2002 |
| JP | 2004-008323 A | 1/2004 |
| JP | 2020-106552 A | 7/2020 |

* cited by examiner

*Primary Examiner* — Jayanti K Patel
*Assistant Examiner* — Christopher Kingsbury Glover
(74) *Attorney, Agent, or Firm* — Cowan, Liebowitz & Latman, P.C.

(57) ABSTRACT

A line-of-sight detecting apparatus includes a processor configured to acquire an estimated gaze point position of a user on a display element based on an eyeball image, perform calibration for the estimated gaze point position to reduce a difference between the estimated gaze point position and an actual gaze point position of the user, determine whether or not the calibration is to be performed again based on a difference between a first pupil diameter of the user when the calibration was performed and a second pupil diameter of the user when the estimated gaze point position was acquired based on an eyeball image acquired after the calibration, notify the user of information about performing again the calibration in a case where it is determined that the calibration is to be performed again, and perform again the calibration in a case where it is determined that the user has instructed to perform again the calibration according to notified information.

13 Claims, 16 Drawing Sheets

| idx | DIVIDED PUPIL DIAMETER [um] | PUPIL DIAMETER DIFFERENCE THRESHOLD |
|---|---|---|
| 0 | 2000 | TH_MIN |
| 1 | 2500 | TH_1 |
| 2 | 3000 | TH_2 |
| 3 | 3500 | TH_3 |
| 4 | 4000 | TH_4 |
| 5 | 4500 | TH_5 |
| 6 | 5000 | TH_6 |
| 7 | 5500 | TH_7 |
| 8 | 6000 | TH_8 |
| 9 | 6500 | TH_9 |
| - | OUTSIDE RANGE | TH_MAX |

| idx | PUPIL DIAMETER[um] | CORRECTION INFO |
|---|---|---|
| 0 | 5500 | CORRECTION INFO_0 |
| 1 | NO INFO | NO INFO |
| 2 | NO INFO | NO INFO |
| 3 | NO INFO | NO INFO |
| 4 | NO INFO | NO INFO |
| 5 | NO INFO | NO INFO |
| 6 | NO INFO | NO INFO |
| 7 | NO INFO | NO INFO |
| 8 | NO INFO | NO INFO |
| 9 | NO INFO | NO INFO |

FIG. 11B

| idx | PUPIL DIAMETER[um] | CORRECTION INFO |
|---|---|---|
| 0 | 5500 | CORRECTION INFO_0 |
| 1 | 3600 | CORRECTION INFO_1 |
| 2 | 6200 | CORRECTION INFO_2 |
| 3 | 4200 | CORRECTION INFO_3 |
| 4 | NO INFO | NO INFO |
| 5 | NO INFO | NO INFO |
| 6 | NO INFO | NO INFO |
| 7 | NO INFO | NO INFO |
| 8 | NO INFO | NO INFO |
| 9 | NO INFO | NO INFO |

FIG. 11C

| idx | PUPIL DIAMETER[um] | CORRECTION INFO |
|---|---|---|
| 0 | 2500 | NO INFO |
| 1 | 3500 | NO INFO |
| 2 | 4500 | NO INFO |
| 3 | 5500 | CORRECTION INFO_0 |
| 4 | 6500 | NO INFO |
| 5 | 7500 | NO INFO |
| 6 | NO INFO | NO INFO |
| 7 | NO INFO | NO INFO |
| 8 | NO INFO | NO INFO |
| 9 | NO INFO | NO INFO |

| CALIBRATION REGISTRATION | | |
|---|---|---|
| REGIST-RATION NO. | PUPIL DIAMETER | REGISTRATION STATUS |
| 0 | 2.5mm | UNREGISTERED |
| 1 | 3.5mm | UNREGISTERED |
| ▶ 2 | 4.5mm | UNREGISTERED |
| 3 | 5.5mm | REGISTERED |
| 4 | 6.5mm | UNREGISTERED |
| 5 | 7.5mm | UNREGISTERED |
| 6 | UNREGISTERED | UNREGISTERED |
| 7 | UNREGISTERED | UNREGISTERED |
| 8 | UNREGISTERED | UNREGISTERED |

FIG. 12

LINE-OF-SIGHT DETECTING APPARATUS, IMAGE PICKUP APPARATUS, LINE-OF-SIGHT DETECTING METHOD, AND STORAGE MEDIUM

BACKGROUND

Technical Field

One of the aspects of the embodiments relates to a line-of-sight (visual line) detecting apparatus, an image pickup apparatus, a line-of-sight detecting method, and a storage medium.

Description of Related Art

Japanese Patent Laid-Open No. 2004-8323 discloses a camera control apparatus that can recognize an object intended by a user based on information on a line-of-sight position of a user looking through a finder (viewfinder) and perform focus control. In a case where a camera detects a line-of-sight position of the user, there may be a shift between the line-of-sight position intended by the user and the line-of-sight position of the user recognized by the camera, and an object intended by the user may not be focusable. Accordingly, Japanese Patent Laid-Open No. 2004-8323 discloses a calibration technology that displays an index in the finder prior to imaging, issues an instruction to the user to gaze at the index, detects the line-of-sight position of the user in the gaze state, detects a shift amount from the index position, and corrects a line-of-sight detection position of the user recognized by the camera during imaging by the detected shift amount, thereby detecting a line-of-sight position intended by the user.

Japanese Patent Laid-Open No. 2004-8323 discloses an image pickup apparatus that corrects a line-of-sight position detected by the camera in detecting a line-of-sight position of the user, if there is a shift between the line-of-sight position intended by the user and the line-of-sight position detected by the camera. Japanese Patent Laid-Open No. 2020-106552 discloses an image pickup apparatus that allows a user to manually change an index position that indicates a displayed gaze point position.

It is known that a gaze point position detected by the camera changes depending on a pupil diameter of a user looking through the finder. The configuration disclosed in Japanese Patent Laid-Open No. 2004-8323 cannot always perform calibration according to the pupil diameter. It is difficult for the user to recognize the pupil diameter during calibration and to determine whether to perform calibration again during imaging. The image pickup apparatus disclosed in Japanese Patent Laid-Open No. 2020-106552 has difficulty in improving the correction accuracy in a case where a gaze position is changed during calibration.

SUMMARY

A line-of-sight detecting apparatus according one aspect of the embodiment includes a memory storing instructions, and a processor configured to execute the instructions to acquire an estimated gaze point position of a user on a display element based on an eyeball image of the user acquired from an image sensor, perform calibration for the estimated gaze point position so as to reduce a difference between the estimated gaze point position and an actual gaze point position of the user, determine whether or not the calibration is to be performed again based on a difference between a first pupil diameter of the user when the calibration was performed and a second pupil diameter of the user when the estimated gaze point position was acquired based on an eyeball image acquired after the calibration, notify the user of information about performing again the calibration in a case where it is determined that the calibration is to be performed again, and perform again the calibration in a case where it is determined that the user has instructed to perform again the calibration according to notified information. An image pickup apparatus having the above line-of-sight detection apparatus also constitutes another aspect of the embodiment. A line-of-sight detecting method corresponding to the above line-of-sight detection apparatus also constitutes another aspect of the embodiment. A storage medium storing a program that causes a computer to execute the above line-of-sight detecting method also constitutes another aspect of the embodiment.

Further features of the disclosure will become apparent from the following description of embodiments with reference to the attached drawings.

BRIEF DESCRIPTION OF THE DRAWINGS

FIG. 8 illustrates a lookup table of a plurality of predetermined values corresponding to pupil diameters in the first embodiment.

FIGS. 11A, 11B, and 11C illustrate lookup tables of a plurality of pieces of calibration information corresponding to pupil diameters in the second and third embodiments.

FIG. 12 explains a notification screen according to the third embodiment.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

First Embodiment

Figure 1A:
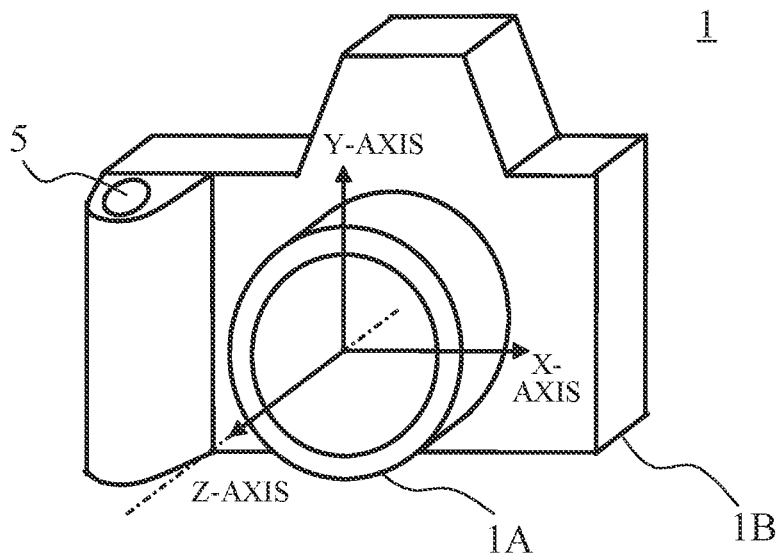
FIGS. 1A, 1B, and 1C are external views of an image pickup apparatus according to a first embodiment.
Figure 1B:
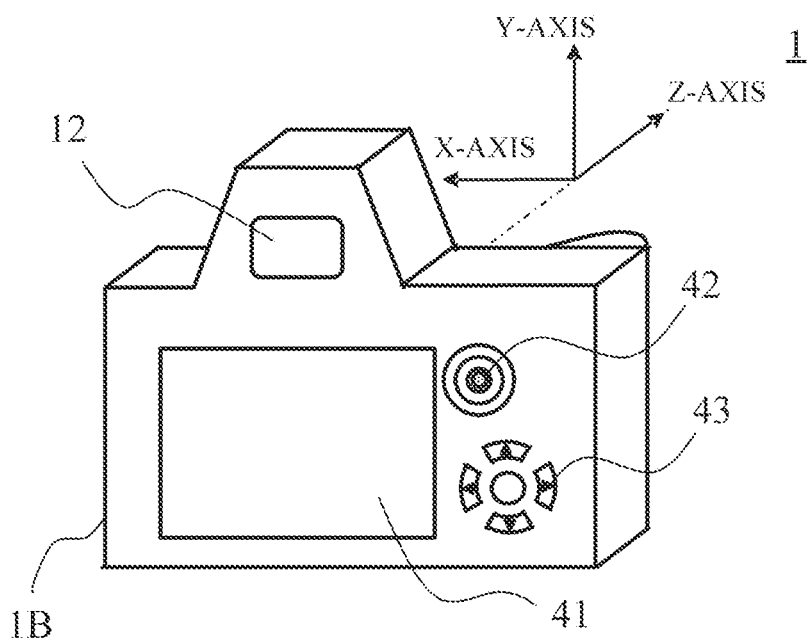
Figure 1C:
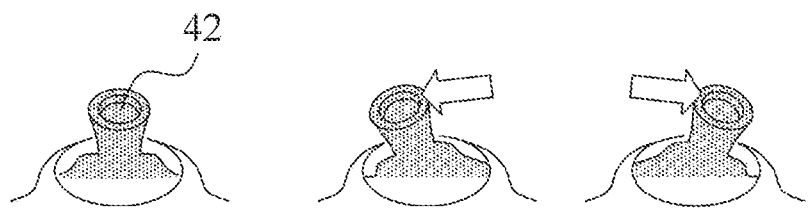

Referring now to FIGS. 1A, 1B, and 1C, a description will be given of an external configuration of an image pickup apparatus (digital still camera) 1 according to a first embodiment. FIGS. 1A and 1B are external views of the image pickup apparatus 1. FIG. 1A is a front perspective view, and FIG. 1B is a rear perspective view, respectively. As illustrated in FIG. 1A, the image pickup apparatus 1 includes a lens apparatus 1A and a camera body 1B. In this embodiment, the lens apparatus 1A is attachable to and detachable from the camera body 1B, but the present disclosure is not limited to this embodiment. This embodiment is applicable to an image pickup apparatus in which the lens apparatus and the camera body are integrated with each other.

The camera body 1B includes a release button 5, which is an operation member for accepting an imaging operation from the user. As illustrated in FIG. 1B, an eyepiece lens 12 is disposed on the rear surface of the image pickup apparatus 1 so that the user can look into a display element (described below) provided inside the camera. Arranged on the rear surface of the image pickup apparatus 1 are operation members 41 to 43 for use in camera operation, which will be described below. The operation member 41 is, for example, a touch panel compatible liquid crystal. The operating member 42 is, for example, a lever type operation member as illustrated in FIG. 1C. The operation member 43 is, for example, a button-type cross key.

Figure 2:
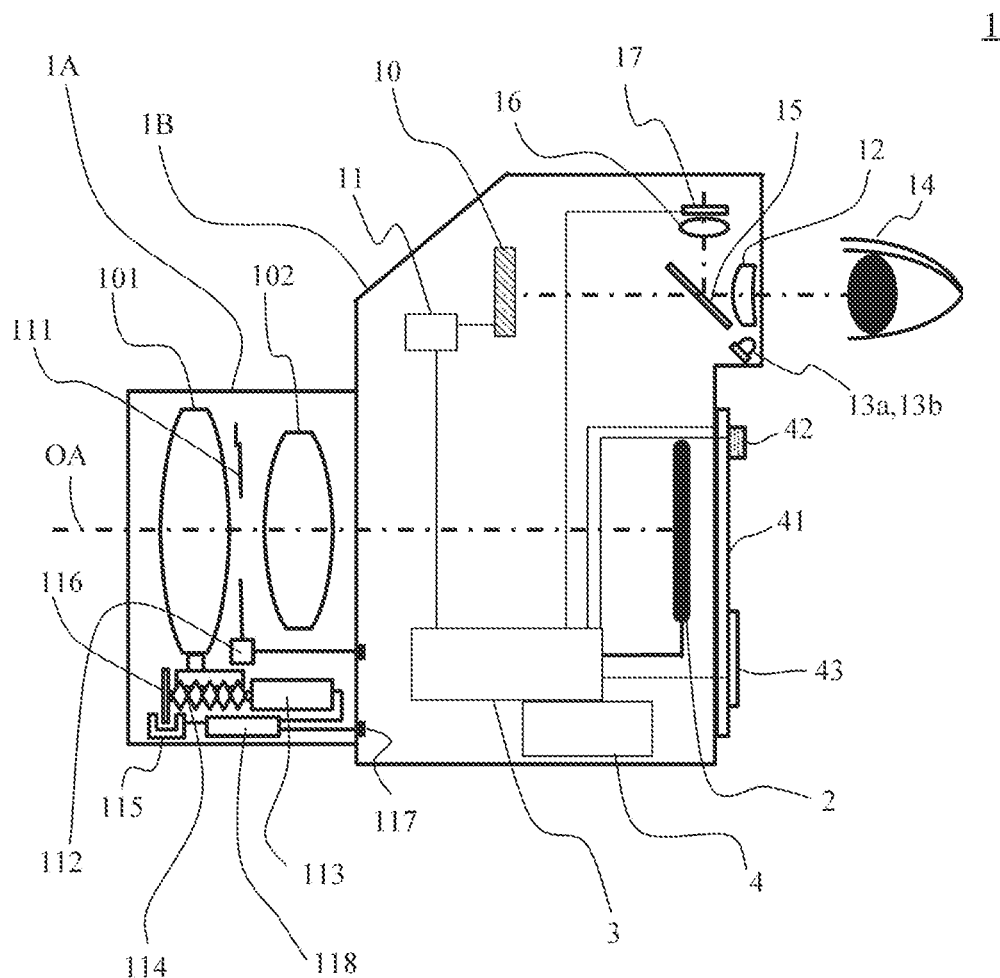
FIG. 2 is an internal configuration diagram of the image pickup apparatus according to the first embodiment.

Referring now to FIG. 2, a description will be given of the internal configuration of the image pickup apparatus 1. FIG. 2 is an internal configuration diagram of the image pickup apparatus 1, and illustrates a sectional view of the image pickup apparatus 1 taken along a YZ plane formed by the Y-axis and the Z-axis in FIGS. 1A and 1B. In FIGS. 1A, 1B and 2, corresponding parts are designated by the same reference numerals. FIG. 2 illustrates an imaging optical system of the lens apparatus 1A includes two lenses 101 and 102 along the optical axis OA, but the imaging optical system may actually include more than two lenses. An image sensor 2 has a photoelectric conversion element such as a CMOS sensor or a CCD sensor, photoelectrically converts an object image (optical image) formed by the lens apparatus 1A, and outputs image data. A control unit (line-of-sight detecting apparatus) 3 has a CPU and the like, and controls the entire camera body 1B. A memory unit 4 stores image data captured and output by the image sensor 2. A display element 10 includes liquid crystal or the like, and displays a captured image. A display element driving circuit 11 drives the display element 10. The eyepiece lens 12 is used by the user to observe an object image displayed on the display element 10.

Light sources 13a and 13b are illumination light sources that illuminate an eyeball 14 of a user for detecting a line-of-sight direction from a relationship between a reflected image due to the corneal reflection of each light source and a pupil, which has been conventionally used in a single-lens reflex camera and the like. The light sources 13a and 13b have infrared light emitting diodes, for example, and are arranged around the eyepiece lens 12. An illuminated eyeball image and images of the light sources 13a and 13b by the corneal reflection transmit through the eyepiece lens 12, are reflected by a beam splitter (optical divider) 15, and are imaged via a light-receiving lens 16 on the image sensor 17 in which photoelectric element arrays such as CCDs are two-dimensionally arranged. The light-receiving lens 16 positions the pupil of the eyeball 14 of the user and the eyeball image sensor 17 in a conjugate imaging relationship. Based on the positional relationship between the eyeball imaged on the eyeball image sensor 17 and the images of the light sources 13a and 13b due to the corneal reflection, a line-of-sight direction is detected by a predetermined algorithm, which will be described below.

The lens apparatus 1A includes an aperture stop 111, an aperture driving apparatus 112, a lens driving motor 113, a lens driving member 114, a photocoupler 115, a pulse plate 116, a mount contact 117, and a focusing circuit 118. The lens driving member 114 has a driving gear and the like. The photocoupler 115 detects rotation of the pulse plate 116 interlocked with the lens driving member 114 and notifies the focusing circuit 118 of the result. Based on this information and the lens driving amount information obtained from the camera body 1B, the focusing circuit 118 drives the lens driving motor 113 by a predetermined amount to move the lens apparatus 1A to an in-focus position. The mount contact 117 is a mount contact that serves as an interface between the lens apparatus 1A and the camera body 1B.

Figure 3:
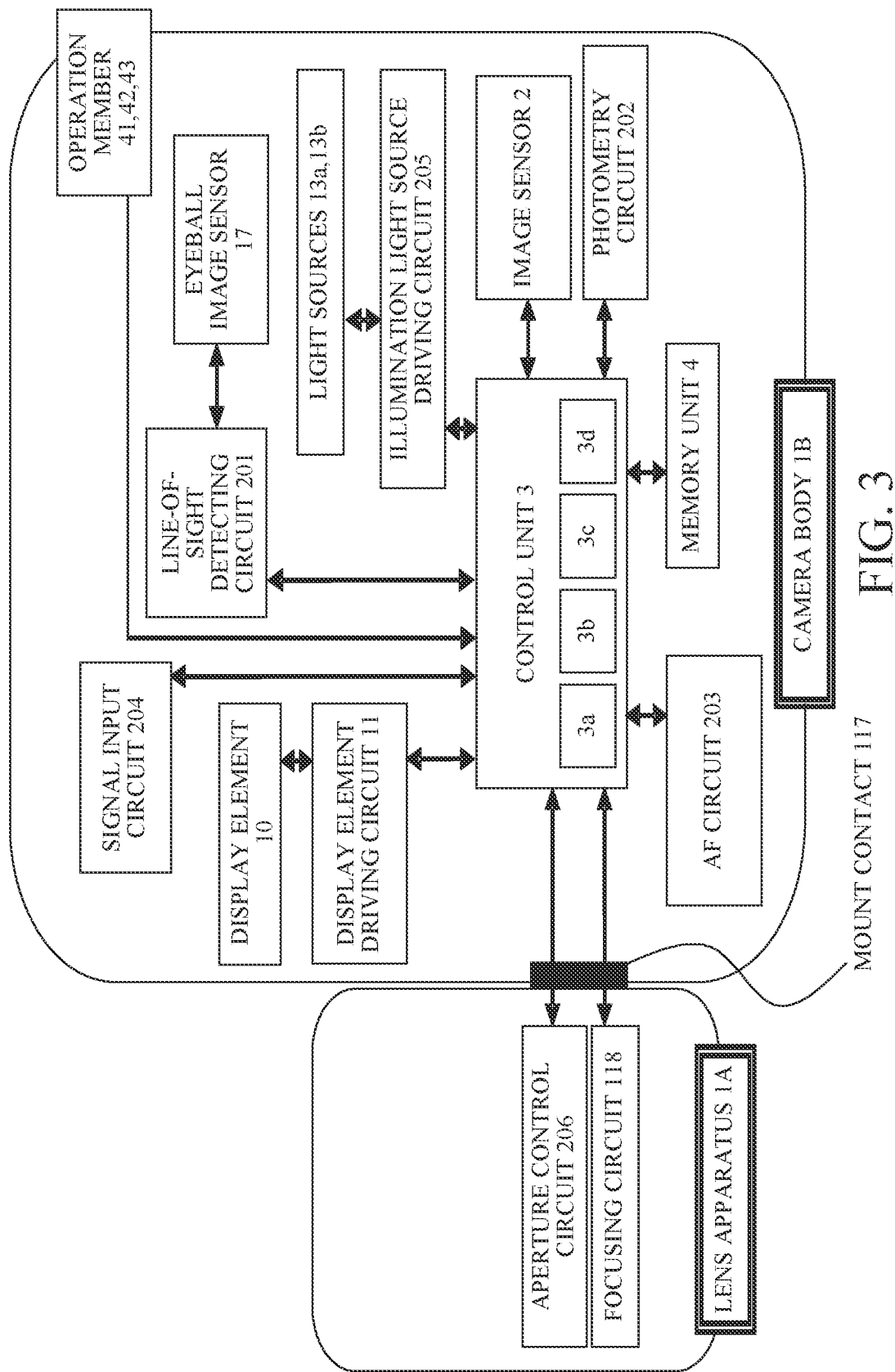
FIG. 3 is a block diagram of the image pickup apparatus according to the first embodiment.

Referring now to FIG. 3, a description will be given of an electrical configuration of the image pickup apparatus 1. FIG. 3 is a block diagram of the image pickup apparatus 1. Those elements in FIG. 3, which are corresponding elements in FIGS. 1A, 1B, and 1C are designated by the same reference numerals. A line-of-sight detecting circuit 201, a photometry circuit 202, an autofocus (AF) circuit (automatic focus detection circuit) 203, a signal input circuit 204, the display element driving circuit 11, and an illumination light source driving circuit 205 are connected to the control unit 3 in the camera body 1B. The control unit 3 communicates signals to the focusing circuit 118 in the lens apparatus 1A and the aperture control circuit 206 included in the aperture driving apparatus 112 via the mount contact 117. The memory unit 4 stores imaging signals from the image sensor 2 and the eyeball image sensor 17, and also stores line-of-sight correction data for correcting individual differences in lines of sight, which will be described below.

The line-of-sight detecting circuit 201 A/D-converts an output signal (image information) generated by forming an eyeball image from the eyeball image sensor (CCD-EYE) 17 and transmits this image information to the control unit 3.

The control unit 3 extracts each feature point of the eyeball image required for line-of-sight detection according to the predetermined algorithm, which will be described below, and further calculates the line of sight of the user from the position of each feature point. The photometry circuit 202 amplifies the luminance signal output corresponding to the luminance of the field based on the signal obtained from the image sensor 2 which also serves as a photometry sensor, and then logarithmically compresses and A/D converts it, and transmits it to the control unit 3 as field luminance information.

The AF detecting circuit 203 A/D-converts signal voltages from a plurality of pixels for phase difference detection in the image sensor 2 and sends them to the control unit 3. The control unit 3 calculates a distance to the object corresponding to each focus detecting point from the signals of a plurality of pixels in the image sensor 2 (imaging-surface phase-difference AF). In this embodiment, for example, there are 180 focus detecting points at positions on the imaging surface corresponding to positions indicated by field images in the finder in FIGS. 4A, 4B, and 4C, which will be described below.

The signal input circuit 204 is connected to a switch SW1 that is turned on by a first stroke of the release button 5 to start photometry, distance measurement, line-of-sight detection, etc. of the camera, and a switch SW2 that is turned on by a second stroke of the release button 5 to start a release operation. Signals from the switches SW1 and SW2 are input to the signal input circuit 204 and transmitted to the control unit 3.

The control unit 3 serves as a line-of-sight detecting apparatus according to this embodiment, and includes an estimation unit 3a, a correction unit 3b, a determination unit 3c, and a notification unit 3d. The estimation unit 3a acquires an estimated gaze point position of the user on the display element 10 based on an eyeball image of the user acquired from the eyeball image sensor 17. The correction unit 3b performs calibration (correction) for the estimated gaze point position so as to reduce a difference between the estimated gaze point position and an actual gaze point position of the user. The determination unit 3c determines whether or not the calibration is to be performed again based on a difference between a first pupil diameter of the user when the calibration was performed and a second pupil diameter of the user when the estimated gaze point position was acquired (when the line-of-sight detecting operation is performed). The notification unit 3d notifies the user of information about performing again the calibration in a case where the determination unit 3c determines that the calibration is to be performed again.

Figure 4A:
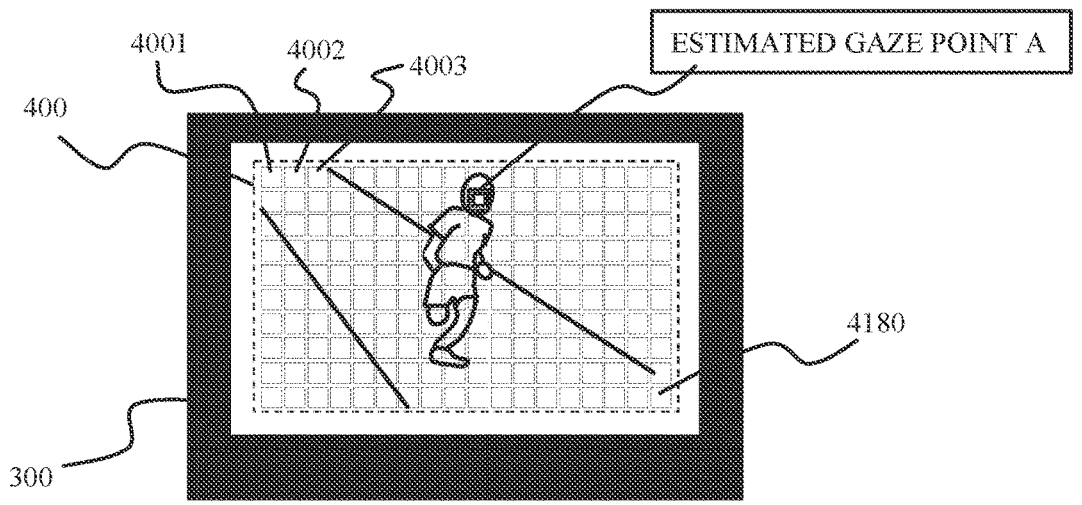
FIGS. 4A, 4B, and 4C explain fields in a finder in the first embodiment.
Figure 4B:
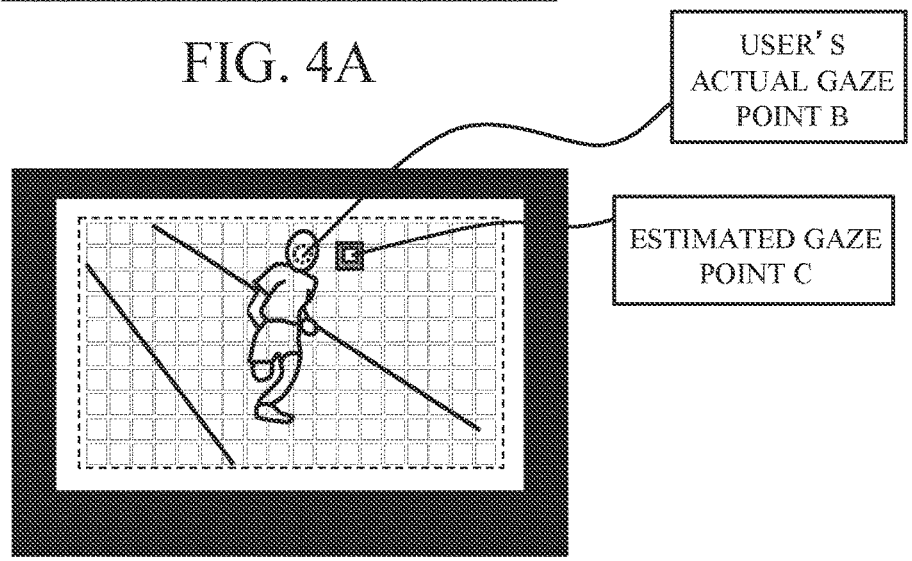
Figure 4C:
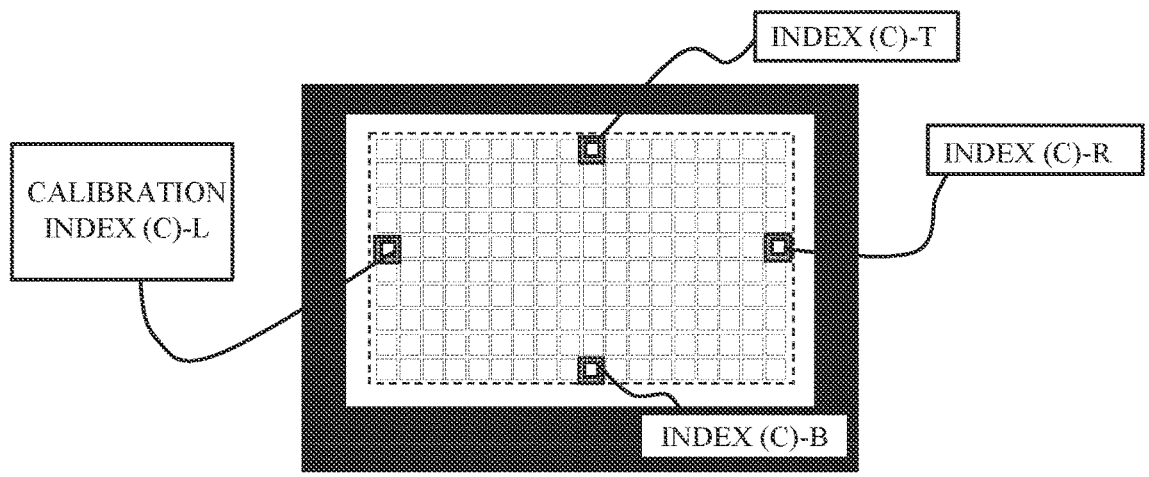

FIGS. 4A, 4B, and 4C explain fields within the finder, illustrating states in which the display element 10 operates. In FIG. 4A, reference numeral 300 denotes a field mask, reference numeral 400 denotes a focus detecting area, and reference numerals 4001 to 4180 denote 180 focus detecting point indexes displayed and superimposed on a through image (live-view image) illustrated on the display element 10 at positions corresponding to a plurality of focus detecting points on the imaging surface. Among those indices, an index corresponding to the current estimated gaze point position is displayed with a frame like an estimated gaze point A in FIG. 4A (an index indicating the gaze point position estimated by the estimation unit 3a is displayed on the display element 10).

Figure 5:
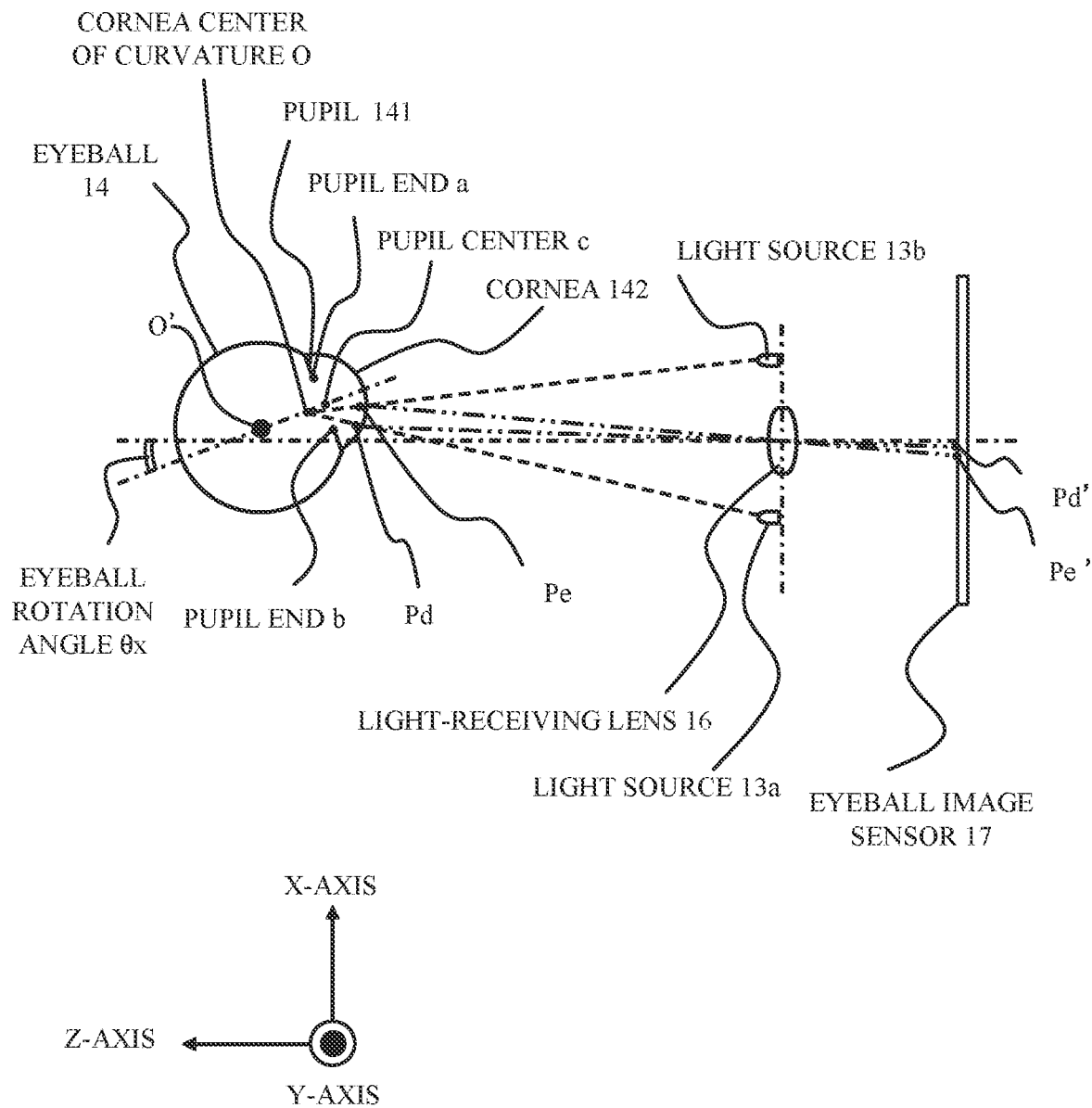
FIG. 5 explains the line-of-sight detection principle according to the first embodiment.
Figure 6A:
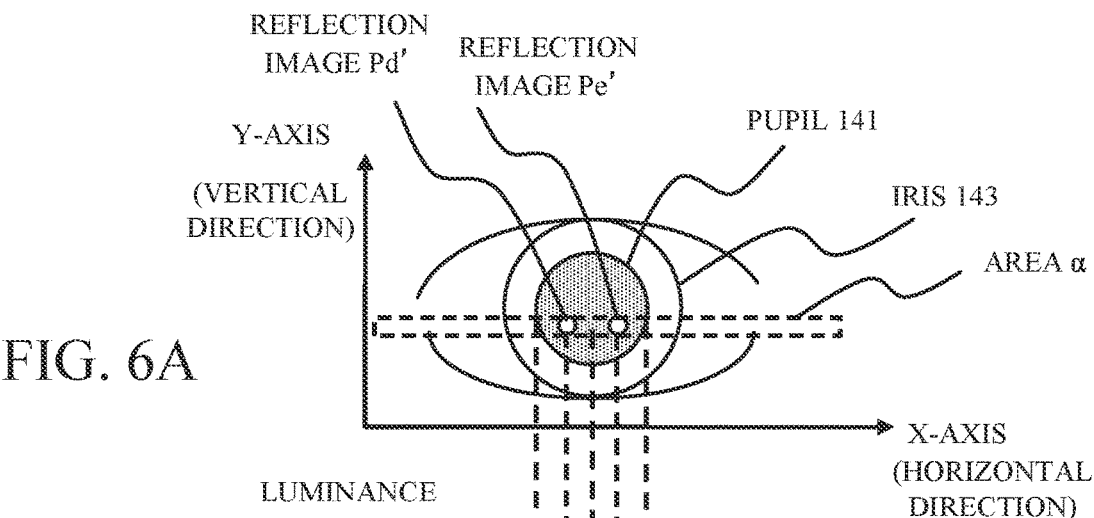
FIGS. 6A and 6B explain an eyeball image projected onto an eyeball image sensor and the output intensity of the eyeball image sensor in the first embodiment.
Figure 6B:
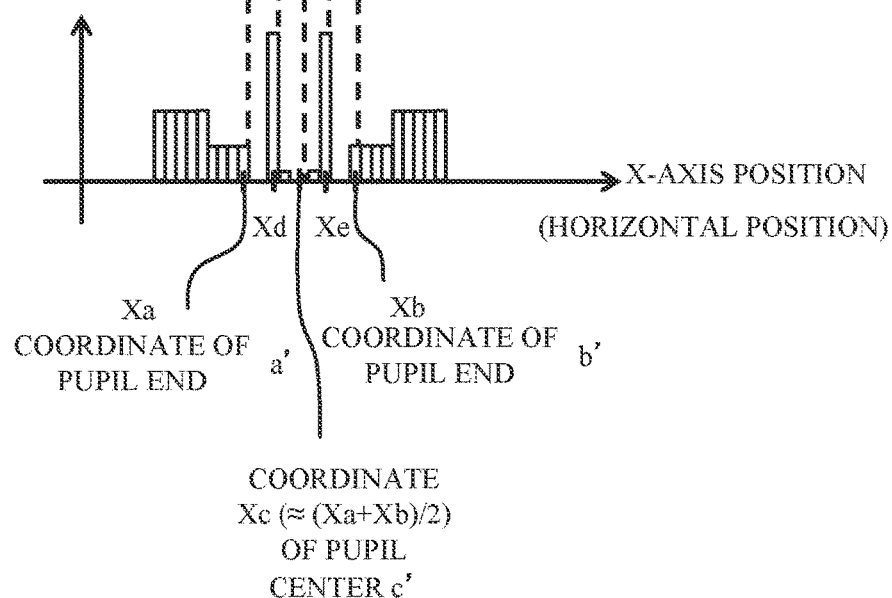
Figure 7:
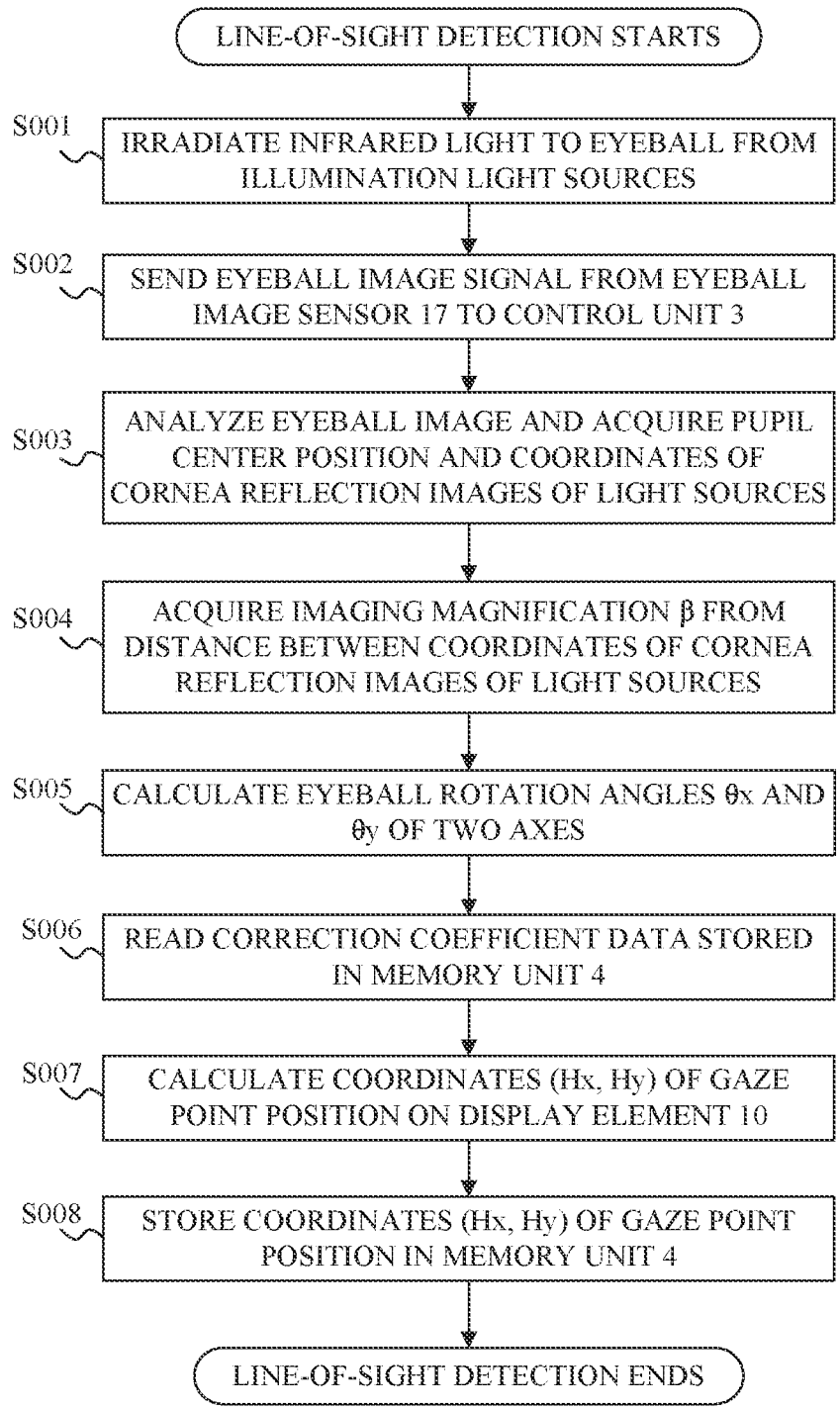
FIG. 7 is a flowchart illustrating line-of-sight detection processing according to the first embodiment.

Referring now to FIGS. 5 to 7, a description will be given of user's line-of-sight detection processing. FIG. 5 explains the line-of-sight detecting principle. In FIG. 5, the light sources 13a and 13b are light sources such as light-emitting diodes that emit infrared light that is imperceptible to the user. The light sources 13a and 13b are arranged substantially symmetrically with respect to the optical axis of the light-receiving lens 16, and illuminate the eyeball 14 of the user. A part of the illumination light reflected by the eyeball 14 is collected by the light-receiving lens 16 onto the eyeball image sensor 17.

FIG. 6A explains an eyeball image projected on the eyeball image sensor 17. FIG. 6B explains the output intensity of the CCD of the eyeball image sensor 17. FIG. 7 is a flowchart illustrating line-of-sight detection processing (line-of-sight detecting routine). In FIG. 7, when the line-of-sight detecting routine starts, the light sources 13a and 13b emit infrared light toward the eyeball 14 of the user in step S001. The eyeball image of the user illuminated by the infrared light is formed on the eyeball image sensor 17 through the light-receiving lens 16, photoelectrically converted by the eyeball image sensor 17, and the eyeball image can be processed as an electric signal.

Next, in step S002, an eyeball image signal obtained from the eyeball image sensor 17 is sent to the control unit 3. Next, in step S003, the control unit 3 finds the coordinates of points corresponding to corneal reflection images Pd and Pe of the light sources 13a and 13b and a pupil center c from the information of the eyeball image signal obtained in step S002, as illustrated in FIG. 5. Infrared light emitted from the light sources 13a and 13b illuminates a cornea 142 of the eyeball 14 of the user. At this time, the corneal reflection images Pd and Pe formed by part of the infrared light reflected on the surface of the cornea 142 are condensed by the light-receiving lens 16 and formed on the eyeball image sensor 17 (points Pd' and Pe' in FIG. 5). Similarly, the light beams from ends "a" and "b" of the pupil 141 are also imaged on the eyeball image sensor 17.

In FIGS. 6A and 6B, the horizontal direction is set to the X-axis and the vertical direction is set to the Y-axis. Assume that Xd and Xe are coordinates in the X-axis direction (horizontal direction) of the images Pd' and Pe' formed by the corneal reflection images of the light sources 13a and 13b, and Xa and Xb are coordinates in the X-axis direction of the images "a'" and "b'" formed by the light beams from the ends "a" and "b" of the pupil 141, respectively. As illustrated in FIG. 6B, at the positions Xd and Xe corresponding to the images Pd' and Pe' formed by the corneal reflection images of the light sources 13a and 13b, extremely high levels of luminances are obtained. An area between coordinates Xa and Xb, which corresponds to the area of the pupil 141, has an extremely low level of luminance, except for the positions Xd and Xe.

On the other hand, in an area having an X-coordinate value lower than the position Xa and an area having an X-coordinate value higher than the position Xb, which corresponds to the area of an iris 143 outside the pupil 141, intermediate values between the above two types of luminance levels are obtained. From the luminance level fluctuation information against the X-coordinate position, X-coordinates Xd and Xe of the images Pd' and Pe' formed by the corneal reflection images of the light sources 13a and 13b and X-coordinates Xa and Xb of the pupil edge images a' and b' can be obtained. In a case where the rotation angle θx of the optical axis of the eyeball 14 relative to the optical axis of the light-receiving lens 16 is small, the coordinate Xc of the position (referred to as c') corresponding to the pupil center c imaged on the eyeball image sensor 17 can be expressed as $Xc \approx (Xa+Xb)/2$. From the above, the X-coordinate of c' corresponding to the pupil center formed on the eyeball image sensor 17 and the coordinates of the corneal reflection images Pd' and Pe' of the light sources 13a and 13b can be estimated. Next, in step S004 of FIG. 7, the control unit 3 calculates the imaging magnification β of the eyeball image. β is a magnification determined by the position of the eyeball 14 relative to the light-receiving lens 16, and can be obtained substantially as a function of a distance (Xd−Xe) between the corneal reflection images Pd' and Pe'. Next, in step S005, the control unit 3 calculates the rotation angles (two-axis eyeball rotation angles) θx and θy of the eyeball 14 of the user. Here, the X-coordinate of the midpoint of the corneal reflection images Pd and Pe and the X-coordinate of the center of curvature θ of the cornea 142 approximately coincide with each other. Therefore, the rotation angle θX of the optical axis of the eyeball 14 in the ZX plane is given by the following equation (1):

$$\beta * Oc * \text{SIN } \theta X \approx \{(Xd+Xe)/2\} - Xc \qquad (1)$$

where Oc is a standard distance between the center of curvature O of the cornea 142 and the center c of the pupil 141.

FIGS. 5, 6A, and 6B illustrate an example of calculating the rotation angle θx in a case where the user's eyeball rotates within a plane orthogonal to the Y-axis. The method of calculating the rotation angle θy in a case where the user's eyeball rotates within a plane orthogonal to the X-axis is similar.

Next, in step S006, the control unit 3 reads line-of-sight correction coefficients (correction coefficient data) Ax, Bx, Ay, and By for correcting an individual difference in the line of sight of the user, which have been stored in the memory unit 4 and acquired by performing the calibration. Next, in step S007, the user's line of sight position (gaze point, gaze point position) on the display element 10 is obtained using the rotation angles θx and θy. Coordinates (Hx, Hy) of the gaze point position corresponding to the center c of the pupil 141 on the display element 10 can be calculated by the following equations (2A) and (2B).

$$Hx = m \times (Ax \times \theta x + Bx) \qquad (2A)$$

$$Hy = m \times (Ay \times \theta y + By) \qquad (2B)$$

where the coefficient m is a constant determined by the configuration of the finder optical system in the camera body 1B, is a conversion coefficient for converting the rotation angles θx and θy into position coordinates corresponding to the center c of the pupil 141 on the display element 10, is previously determined and stored in the memory unit 4. The line-of-sight correction coefficients Ax, Bx, Ay, and By are correction coefficient data for correcting the individual difference in the line-of-sight of the user, are obtained by performing the calibration described below, and are stored in the memory unit 4 before the line-of-sight detecting routine starts. After the coordinates (Hx, Hy) of the center c of the pupil 141 are calculated on the display element 10, in step S008, the control unit 3 causes the memory unit 4 to store the above coordinates, and the line-of-sight detecting routine ends. This embodiment has discussed the method of obtaining the gaze point coordinates on the display element 10 using the corneal reflection images of the light sources 13a and 13b, but the present invention is not limited to this embodiment. For example, another acquiring method may be used as long as it is a method of acquiring an eyeball rotation angle from a captured eyeball image.

As described above, the line-of-sight detecting routine acquires the rotation angles θx and θy of the eyeball from the eyeball image, and estimates a gaze point position through calculation that converts the coordinates of the pupil center position to a corresponding position on the display element 10. However, due to factors such as individual differences in the shape of human eyeballs, unless the values of the line-of-sight correction coefficients Ax, Ay, Bx, and By are properly adjusted, as illustrated in FIG. 4B, a shift occurs between the position of the point of gaze B which the user is actual gazing at and the position of the estimated gaze point C. In the above example, the user wishes to gaze at a person corresponding to the position of the gaze point B, whereas the camera body 1B incorrectly estimates that the background is being gazed at, and proper focus detection and adjustment cannot be performed. Accordingly, it is necessary to perform calibration before the image pickup apparatus 1 captures an image, to acquire a correction coefficient value suitable for the user, and to store it in the image pickup apparatus 1. An example of calibration will be described below.

In calibration, first, it is necessary to specify which position on the display element 10 the user is actually gazing at. The gaze position is specified by highlighting a plurality of indices at different positions in the field in the finder before imaging, as illustrated in FIG. 4C, and causing the user to view these indices. In gazing at each index, the gaze point detecting flow is performed, and a proper coefficient value is obtained from the calculated estimated gaze point coordinates and the position of each index coordinate. From each gaze point detection result of calibration index (c)-L and calibration index (c)-R, the coefficients in the ZX plane direction of the optical axis of the eyeball 14, that is, Ax and Bx in the coordinate calculation equation described above are calculated. Assume Hx1 and Hx2 are coordinates of the index (c)-L and (c)-R on the display element 10, respectively, and θx1 and θx2 are rotation angles of the eyeball int the gaze obtained by the line-of-sight detecting routine. Then, the rotation angles θx1 and θx2 may be values that take into consideration the influence of scattering and noise, such as an average value or a median value of results obtained a plurality of times. The coordinates (Hx1, Hx2) are represented by the following equations (3A) and (3B) in combination with the coordinate calculation equations described above:

$$Hx1 = m \times (Ax \times \theta x1 + Bx) \qquad (3A)$$

$$Hx2 = m \times (Ax \times \theta x2 + Bx) \qquad (3B)$$

By solving equations (3A) and (3B), the coefficients in the ZX plane direction, that is, the line-of-sight correction coefficients Ax and Bx in the coordinate equations described above are calculated. The coefficients in the ZY plane direction, that is, the line-of-sight correction coefficients Ay and By in the coordinate equations described above are similarly calculated from indices (c)-T and index (c)-B on the display element 10. The calculated line-of-sight correction coefficients Ax, Bx, Ay, and By are stored in the memory unit 4, and the calibration ends. Thus, calculating the line-of-sight correction coefficient through calibration and performing the line-of-sight detecting operation can accurately estimate the gaze point position of the user on the display element 10.

It is generally known that the expansion and contraction of the human iris changes unevenly in the concentric direction. That is, the pupil center position changes depending on the pupil diameter. Therefore, in a case where the user's pupil diameter changes, the gaze point position detected by the camera changes, so calibration is to be performed again in order to maintain accuracy. However, it is difficult for the user to grasp his own pupil diameter and to properly determine the necessity of calibration after considering the difference from the pupil diameter in the last calibration. In order to solve this problem, this embodiment determines from the pupil diameter of the user whether or not it is necessary to perform calibration again, and notifies the user of the result. Thereby, the user can know that it is necessary to perform calibration again due to a change in pupil diameter, and the user can maintain accuracy by performing calibration again. An example of the configuration will be described below.

A description will now be given of a method for calculating a pupil diameter. Referring to FIGS. 6A and 6B, a description has been given of the method of acquiring the coordinates Xa and Xb in the X-axis direction of the images a' and b' formed by the light beams from the ends a and b of the pupil 141. Hence, in a case where the rotation angle θx of the optical axis of the eyeball 14 relative to the optical axis of the light-receiving lens 16 is small, a distance between the pupil edge a' and the pupil edge b' imaged on the eyeball image sensor 17 can be expressed as (Xb−Xa). Since the imaging magnification β of the eyeball image is also known, the horizontal distance between the pupil ends a and b, that is, the horizontal pupil diameter can be obtained from the following equation (4).

$$\beta * \text{pupil diameter} \approx (Xb-Xa) \quad (4)$$

The same is true for the vertical direction, but if the entire pupil is captured in the eyeball image, it can be expected to coincide with the pupil diameter in the horizontal direction. In a case where the entire pupil is not imaged in one of the horizontal or vertical directions, the pupil diameter may be selectively calculated in the direction in which the entire pupil is imaged, and in a case where the entire pupil is imaged in both directions, the average value of pupil diameters in both directions may be employed.

A description will now be given of a method of determining whether or not calibration is to be performed again. As described above, in a case where the pupil diameter when calibration was performed is different from the pupil diameter when line-of-sight detecting operation is performed, it is necessary to perform calibration again in order to accurately detect the gaze point position. On the other hand, in a case where they are equal to each other, the gaze point position can be detected without performing calibration again. Therefore, from the viewpoint of reducing the workload of the user, it is important to properly determine whether or not calibration is to be performed again. A description will now be given of an example of a method for determining whether or not the calibration is to be performed again based on the pupil diameter when the calibration was performed and the pupil diameter when the line-of-sight detecting operation is performed.

A description will now be given of a method of calculating and storing the pupil diameter in calibration. In calibration, the coefficient is calculated and the pupil diameter is further calculated by the above method from the eyeball image that was used for the calculation of the coefficient. As with the coefficient, the calculated pupil diameter may be a value that takes into consideration the influence of fluctuations and noise, such as the average value or the median value of a plurality of calculation results. The calculated pupil diameter is stored in the memory unit 4 together with the coefficient, and the calibration is finished.

A description will now be given of a method of referring to a pupil diameter during calibration and a method of calculating a pupil diameter in the line-of-sight detecting operation. The line-of-sight detecting operation is performed according to the line-of-sight detecting routine described above. At this time, the correction coefficient stored in the memory unit 4 is read, and the pupil diameter stored together with the correction coefficient is also read. The pupil diameter read here corresponds to a first pupil diameter. A pupil diameter is calculated by the above method from the eyeball image that was used to calculate the rotation angles θx and θy. The pupil diameter calculated here corresponds to a second pupil diameter. Thus, the pupil diameter in the calibration, that is, the first pupil diameter can be referred to, and the pupil diameter in the line-of-sight detecting operation, that is, the second pupil diameter is calculated.

A description will now be given of a method for determining whether or not the calibration is to be performed again based on the first pupil diameter and the second pupil diameter. First, a difference (pupil diameter difference) between the first pupil diameter and the second pupil diameter obtained according to the pupil diameter calculating method described above is calculated using the following equation (5):

$$\text{Pupil diameter difference} = \text{ABS}(\text{first pupil diameter} - \text{second pupil diameter}) \quad (5)$$

Next, an absolute value of the pupil diameter difference is compared with a predetermined value. If the absolute value of the pupil diameter difference is larger than the predetermined value, it is determined that calibration is to be performed again.

```
if (pupil diameter difference > predetermined value)
    calibration is to be performed again
else
    calibration is not to be performed again
endif
```

One or more predetermined values designed in advance may be stored in the memory unit 4, or a value calculated based on the first pupil diameter or the second pupil diameter may be used as the predetermined value. In calculating the predetermined value, the coefficients and the like that will be used in the calculation may be previously designed and stored in the memory unit 4. Here, an example of a method for storing a plurality of predetermined previously designed values in the memory unit 4.

A description will now be given of the format of the predetermined value stored in the memory unit 4. FIG. 8 illustrates a lookup table (threshold LUT) of a plurality of predetermined values corresponding to pupil diameters. The pupil diameter difference threshold is a predetermined value corresponding to a divided pupil diameter, and idx denotes a reference number. Although the divided pupil diameter is set to 2000 [μm], 2500 [μm], . . . for description purposes, it is a value properly designed for the embodiment. The same applies to the pupil diameter difference threshold and the table division number.

TH_MIN and TH_MAX are thresholds in a case where an unexpected pupil diameter is set. For example, by storing 0 in both TH_MIN and TH_MAX, it is always determined that calibration is to be performed again in the above necessity determination. On the other hand, by storing the maximum value, such as 999999, in both of them, it is always determined that calibration is not to be performed again. However, these behaviors are not defined in this embodiment, but are values that are properly designed in accordance with the embodiment as well.

An example of procedure for obtaining the predetermined value by referring to the threshold LUT is illustrated below:

```
if (reference pupil diameter <= divided pupil diameter [0])
    predetermined value = TH_MIN
else if (reference pupil diameter <= divided pupil diameter [1])
    predetermined value = TH_1
else if (reference pupil diameter <= divided pupil diameter [2])
    predetermined value = TH_2
else if (reference pupil diameter <= divided pupil diameter [3])
    ~omitted~
else
    predetermined value = TH_MAX
endif
```

For example, in a case where the reference pupil diameter is 5.6 mm, the predetermined value becomes TH_8. The above reference method is merely illustrative, and linear interpolation may be performed from a binary pupil diameter difference threshold near the reference pupil diameter, for example. Although the second pupil diameter is assumed to be set as the reference pupil diameter, it may be the first pupil diameter, or the first pupil diameter and the second pupil diameter may be selectively set. A plurality of threshold LUTs may be stored in the memory unit 4, and a threshold LUT to be referred to may be selected depending on the situation. For example, in a case where the embodiment is directed to the image pickup apparatus 1 illustrated in FIGS. 1A, 1B, and 1C, a threshold LUT to be referred to may be switched between a normal imaging method and an imaging method rotated by 90 degrees around the optical axis, so-called vertical imaging. This configuration can properly determine whether or not calibration is to be performed again based on the first pupil diameter when the calibration was performed and the second pupil diameter when the line-of-sight detecting operation is performed.

Figure 9A:
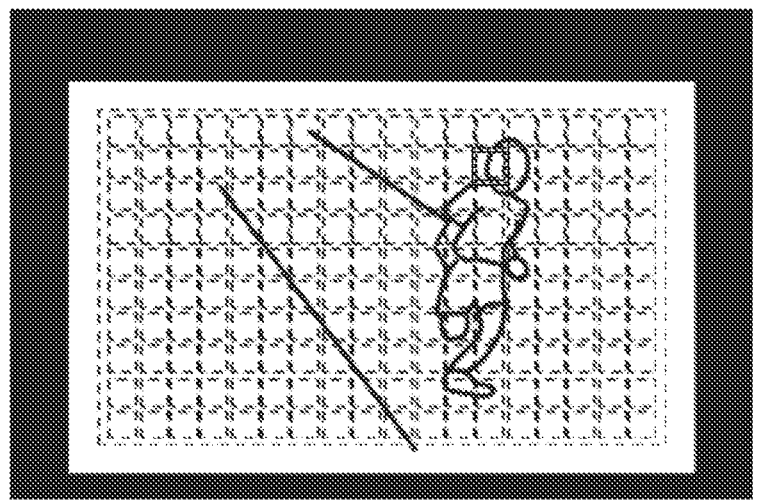
FIGS. 9A and 9B explain fields in a finder in the first embodiment.
Figure 9B:
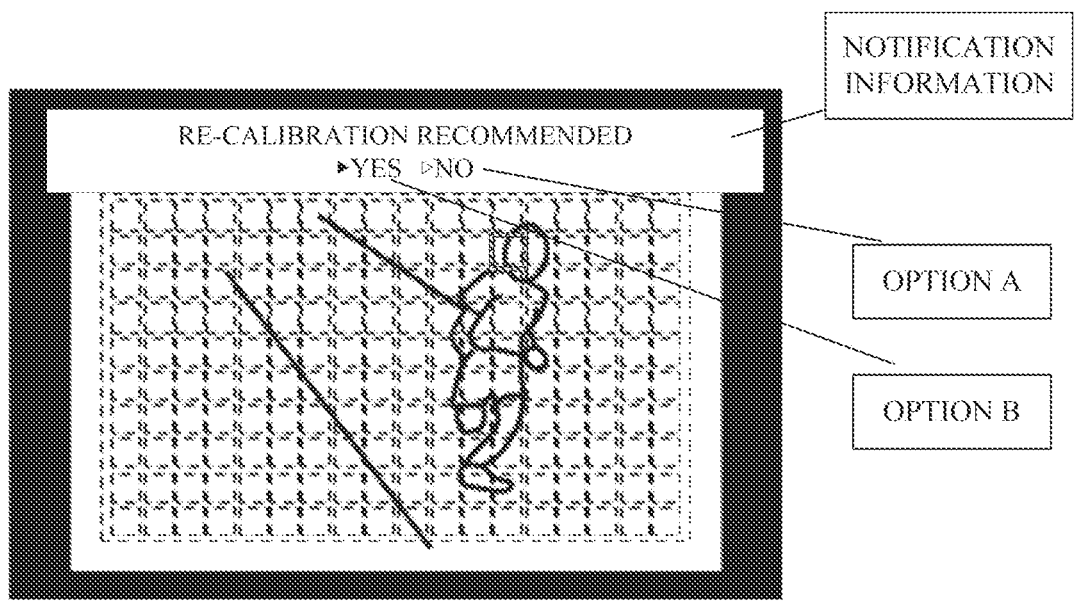

Referring now to FIGS. 9A and 9B, a description will be given of a method of notifying whether calibration is to be performed again. A description will now be given of an example of a method for notifying the user that it is determined that the calibration is to be performed again by the above method for determining whether calibration is to be performed again.

FIGS. 9A and 9B explain fields in the finder similar to those of FIGS. 4A, 4B, and 4C. FIG. 9A illustrates a state before the determination that the calibration is to be performed again is notified, and FIG. 9B illustrates a state after the determination that the calibration is to be performed again is notified. FIG. 9B illustrates, on a through image from the image sensor 2 displayed on the display element 10, information that the calibration is to be performed again, and a UI for instructing whether or not the calibration is to be performed. The user can specify option A or option B by operating the operation member 43 or the like. Option A instructs not to perform calibration, and option B instructs to perform calibration.

The above reference method is illustrative, and for example, the notification may be made by displaying an icon or the like in the field in the finder, or by sound, vibration, or the like. The UI for instructing the execution of calibration may not be displayed, or calibration may be automatically started along with the notification. This configuration can inform the user that it is determined that calibration is to be performed again by the method for determining whether the calibration is to be performed again.

Figure 10A:
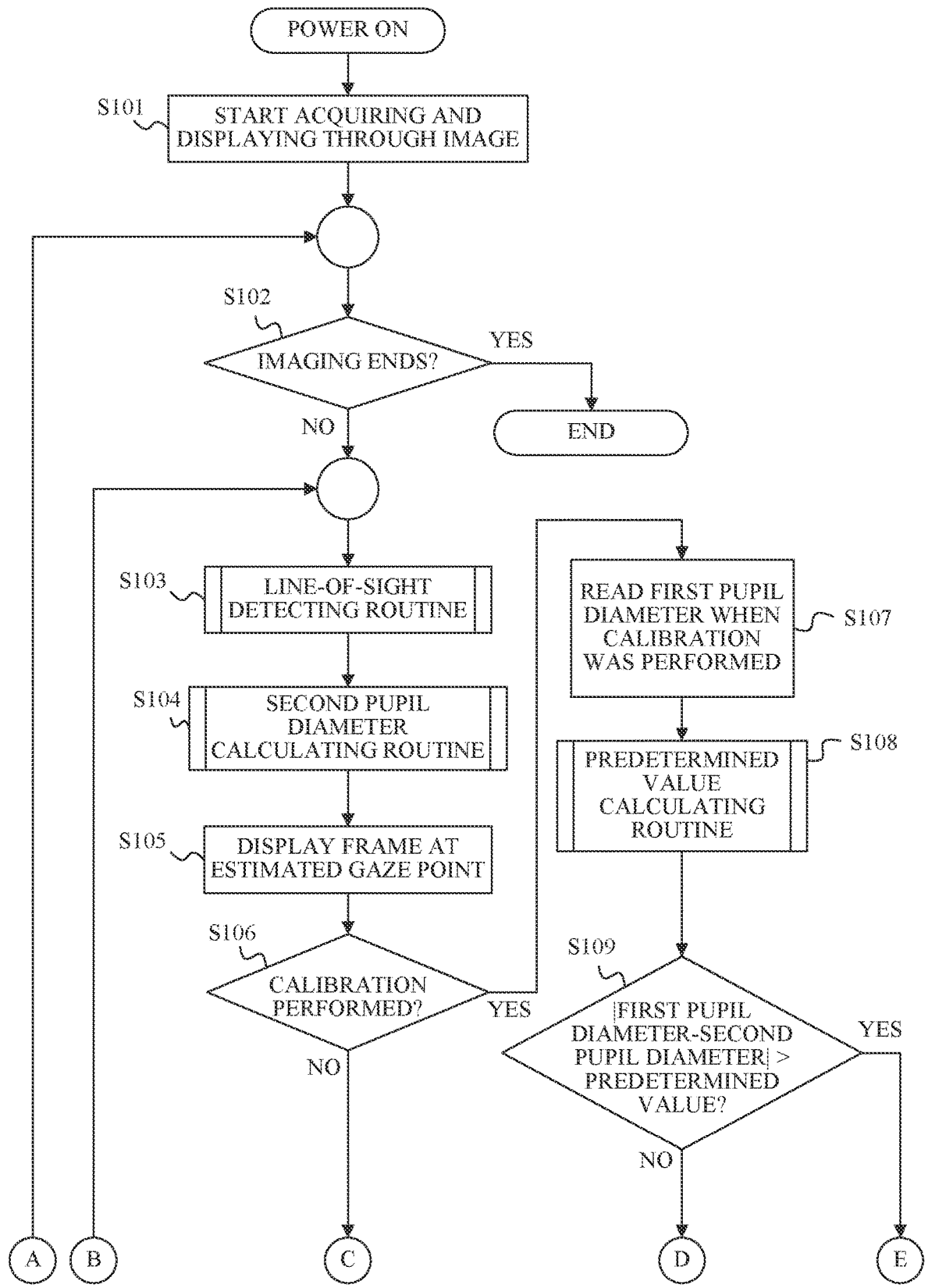
FIGS. 10A and 10B illustrate a flowchart illustrating processing for notifying whether or not calibration is to be performed again in the first and second embodiments.
Figure 10B:
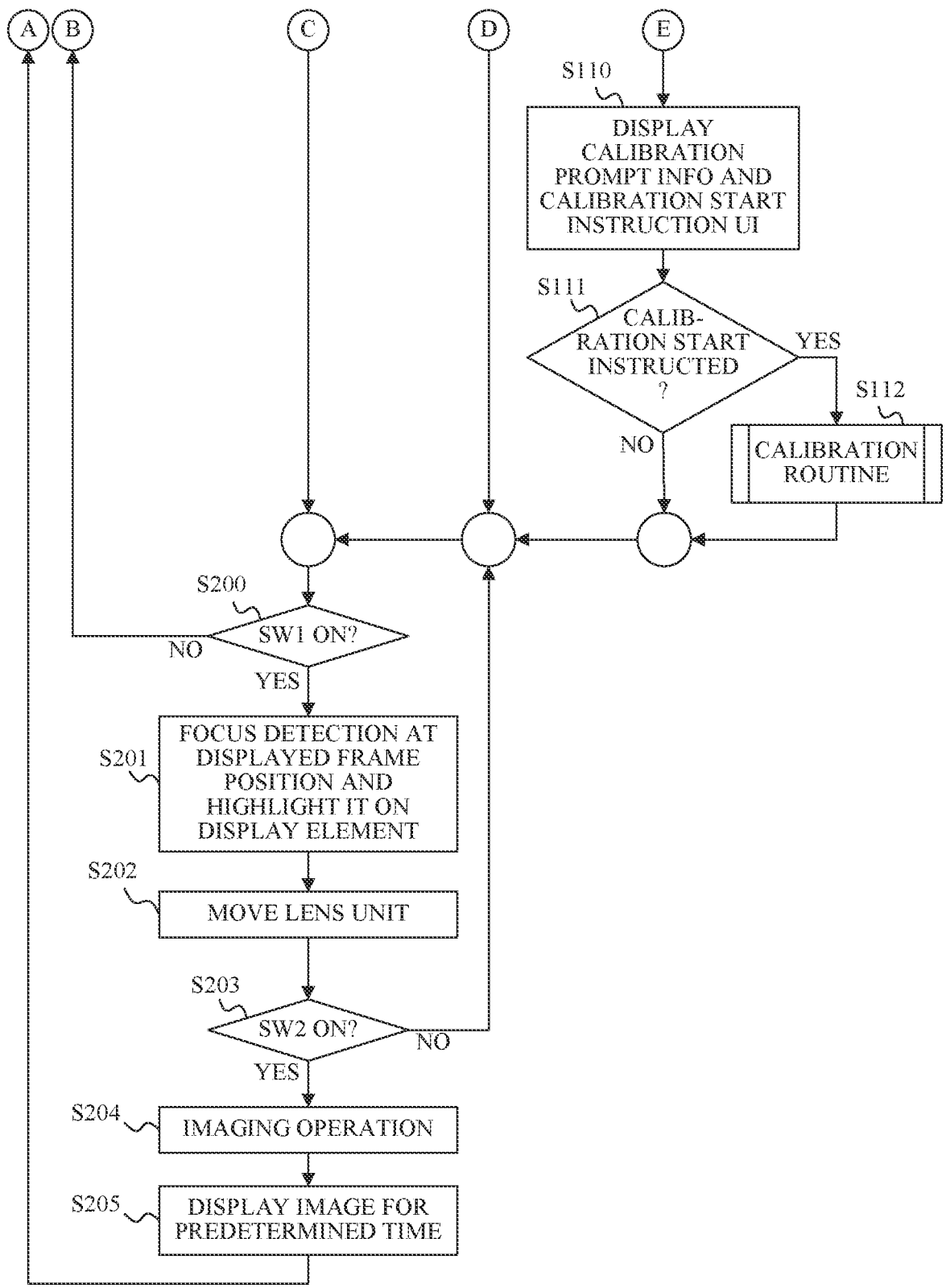

Referring now to FIGS. 10A and 10B, a description will be given of processing of notifying whether or not calibration is to be performed again according to this embodiment. FIGS. 10A and 10B illustrate a flowchart illustrating processing of notifying whether or not calibration is to be performed again. When the camera body 1B is powered on, first in step S101, the image sensor 2 starts acquiring a through image and transmits an image signal to the control unit 3, and the control unit 3 displays the acquired through image on the display element 10. The user visually recognizes the object by viewing the through image displayed on the display element 10 in the finder. Next, in step S102, the control unit 3 determines whether or not the power has been turned off (whether imaging has ended). In a case where it is determined that the power is turned off (imaging has ended), this flow ends. On the other hand, in a case where it is determined that the power is not turned off, the flow proceeds to step S103.

In step S103, the control unit 3 starts acquiring the eyeball image of the user who started to visually recognize the object in step S101, and executes the above line-of-sight detecting routine. In this embodiment, the control unit 3 acquires the coordinates (Hx, Hy) of the estimated gaze point position on the display element 10 by executing the line-of-sight detecting routine described with reference to FIG. 7. Next, in step S104, the control unit 3 performs the above pupil diameter calculating routine using the eyeball image of the user acquired in step S103. Thereby, the pupil diameter (second pupil diameter) when the line-of-sight detecting operation is performed can be acquired.

Next, in step S105, the control unit 3 causes the display element 10 to display an image in which a frame is superimposed on the through image at the position of the estimated gaze point coordinates obtained in the previous step. At this time, the user views the image illustrated in FIG. 4B in the finder, and the current estimated gaze point position (estimated gaze point C) is communicated to the user by displaying the frame superimposed on the through image. Next, in step S106, the control unit 3 determines whether or not normal calibration has been performed. In a case where it is determined that normal calibration has been performed, the flow proceeds to step S107. On the other hand, in a case where it is determined that normal calibration has not been performed, the flow proceeds to step S200.

In step S107, the control unit 3 reads the first pupil diameter (pupil diameter when calibration was performed) from the memory unit 4 according to the above routine for determining whether or not calibration is to be performed again. Next, in step S108, the control unit 3 calculates the above predetermined value from the above threshold value LUT according to the above routine for determining whether or not calibration is to be performed again. Next, in step S109, the control unit 3 determines whether calibration is to be performed again according to the above routine for determining whether or not calibration is to be performed again. In a case where it is determined that calibration is to be performed again (in a case where it is determined that the absolute value of the difference between the first pupil diameter and the second pupil diameter is larger than the predetermined value), the flow proceeds to step S110. On the other hand, in a case where it is determined that calibration is not to be performed again, the flow proceeds to step S200.

In step S110, the control unit 3 executes the above routine for notifying whether calibration is to be performed again. That is, the control unit 3 displays on the display element 10 information that calibration is to be performed (information to prompt calibration) and a UI (start instruction UI) that can instruct whether or not to start the calibration. Next, in step S111, the control unit 3 determines whether or not the user has given an instruction to start calibration. In a case where it is determined that the start of calibration has been instructed, the flow proceeds to step S112. On the other hand, in a case where it is determined that the start of calibration has not been instructed, the flow proceeds to step S200. A calibration start instruction is issued by operating the operation member 43 on the back of the camera body 1B, etc., as described above. In step S112, the control unit 3 performs the above calibration routine, and also performs the above routine for determining whether or not calibration is to be performed again. Thereby, the first pupil diameter (pupil diameter when calibration was performed again) is calculated and stored in the memory unit 4, and the flow proceeds to step S200.

In step S200, the control unit 3 determines whether or not the user has pressed the release button 5 and SW1 is turned on. In a case where the user agrees to perform focusing at the position of the frame of the estimated gaze point displayed on the display element 10, the user presses the release button 5 to turn on SW1. In a case where it is determined that SW1 is turned on, the flow proceeds to step S201. On the other hand, in a case where it is determined that SW1 is not turned on, the flow returns to step S103, and the control unit 3 acquires the gaze point position again.

In step S201, the control unit 3 performs a focus detecting operation (distance measuring operation) at the current position of the display frame, and highlight it to inform the user that the distance measurement operation has been performed on the through image on the display element 10 by changing the color of the frame. Next, in step S202, the control unit 3 moves the imaging optical system (focus lens unit) of the lens apparatus 1A to an in-focus position corresponding to the distance measurement result obtained in step S201. Next, in step S203, the control unit 3 determines whether or not the release button 5 has been further pressed to turn on SW2. In a case where the user agrees to capture an image at the current in-focus position, the user turns on SW2. In a case where it is determined that SW2 is turned on, the flow proceeds to step S204. On the other hand, in a case where it is determined that SW2 is not turned on, the flow returns to step S200, and the control unit 3 again performs focus detection (distance measurement) and display at the same position.

In step S204, the control unit 3 performs an imaging operation. An image signal acquired by the image sensor 2 is transmitted to the control unit 3 and stored in the memory unit 4. Next, in step S205, the control unit 3 displays an acquired image for a predetermined time, and then returns to step S102.

In this embodiment, an image pickup apparatus having a line-of-sight detecting apparatus properly determines whether calibration is to be performed again and notifies the user of the result for a shift in the gaze point position that may occur due to the pupil diameter in a case where the eye looks through the finder. Therefore, this embodiment can improve the convenience of the user by accurately performing calibration correction while reducing the burden of the user associated with calibration.

Second Embodiment

A description will now be given of a second embodiment. The first embodiment has discussed a method of notifying the user of whether calibration is to be performed again in a case where the pupil diameter is different from that when calibration was performed. In the first embodiment, in a case where calibration is performed again, the previously calculated calibration coefficient (calibration information) and the first pupil diameter are overwritten and stored in the memory unit 4. That is, in a case where the second pupil diameter different from the first pupil diameter when calibration was performed again is detected, calibration is to be performed again even when the second pupil diameter is a value close to the first pupil diameter before calibration is performed again. As a result, the frequency of performing again calibration cannot be reduced.

Accordingly, this embodiment stores a plurality of coefficients and the first pupil diameter calculated by calibration performed with a different pupil diameter in the memory unit 4 without overwriting them. Any one of the plurality of first pupil diameters is selected, and a method for determining whether or not calibration is to be performed again as described in the first embodiment is performed. Thereby, the frequency of performing again calibration can be reduced as the number of performing calibration with different pupil diameters increases. A description will now be given of an example of the method and operation according to this embodiment.

Referring now to FIGS. 11A and 11B, a description will be given of a plurality of coefficients and a first pupil diameter stored in the memory unit 4 according to this embodiment. FIGS. 11A and 11B illustrate lookup tables (correction coefficient LUTs) of a plurality of pieces of calibration information corresponding to pupil diameters. The correction information is calibration information corresponding to a pupil diameter, and is a coefficient in this embodiment. idx is a reference number, the maximum value of which is the upper limit number of storable calibration information. The pupil diameter and correction information described as "no information" indicate a state in which calibration information is not stored. In other words, all correction coefficient LUTs in the initial state or subjected to initialization processing such as reset have "no information." As long as the correction coefficient LUT associates the pupil diameter with the calibration information, and does not define the storable upper limit number and the form of the calibration information in this embodiment.

FIG. 11A is the correction coefficient LUT stored in the memory unit 4 after calibration is performed only with a pupil diameter of 5.5 [mm]. FIG. 11B illustrates the correction coefficient LUT stored in the memory unit 4 after calibration is performed with pupil diameters of 3.6 [mm], 6.2 [mm], and 4.2 [mm].

A description will now be given of a method for storing a plurality of calibration results, that is, correction coefficients and first pupil diameters, in the correction coefficient LUT configured in the memory unit 4. This embodiment further adds the following step to the step of storing the coefficients and the first pupil diameters in the memory unit 4 described in the first embodiment. After the coefficient and the first pupil diameter are calculated by calibration, the idx number of the correction coefficient LUT of the memory unit 4 storing them is selected and stored in the area corresponding to the idx number. For the idx number, the pupil diameter of the correction coefficient LUT is scanned, and if "no information" is found, that idx number is selected. If not found, among the pupil diameters stored in the correction coefficient LUT, the idx number corresponding to the closest value of the calculated first pupil diameter is selected.

The following steps are added to the step of referring to the coefficient in the above line-of-sight detecting operation routine and the step of referring to the first pupil diameter in the above routine of determining whether calibration is to be performed again. The line-of-sight detecting operation routine described above calculates the second pupil diameter by the method described above, and reads the correction information in the correction coefficient LUT, that is, the line-of-sight correction coefficients Ax, Bx, Ay, and By according to the method of referring to the correction coefficient LUT, which will be described below. The reference to the first pupil in the routine for determining whether or not calibration is to be performed again reads the first pupil diameter in the above line-of-sight detecting operation routine, and reads the pupil diameter in the correction coefficient LUT according to the method of referring to the correction coefficient LUT, which will be described below. A description will now be given of an example of procedure for acquiring the pupil diameter and correction information with reference to the correction coefficient LUT.

The reference pupil diameter is the second pupil diameter, and the pupil diameter difference C, pupil diameter difference W, scan number I, and reference number I are variables that save the calculation process.

```
pupil diameter difference C = 0
pupil diameter difference W = 9999999
scan number I = 0
reference number I = -1
loop (scan number I < number of LUT elements)
    if (LUT pupil diameter [scan number I]! = no information)
        pupil diameter difference C = ABS (reference pupil diameter -
LUT pupil diameter [scan number I])
        if (pupil diameter difference C < pupil diameter difference W)
            pupil diameter difference W = pupil diameter difference C
            reference number I = scan number I
        endif
    endif
    scan number I = scan number I + 1
end loop
if (reference number I == -1)
    pupil diameter = no information
    correction information = no information
else
    pupil diameter = LUT pupil diameter [reference number I]
    correction information = LUT correction information [reference
        number I]
endif
```

For example, in a case where the reference pupil diameter is 5.6 mm, the LUT pupil diameter is 5500 [μm] and the LUT correction information value is correction information_0. The above reference method is illustrative, and for example, linear interpolation may be performed using the LUT pupil diameter as an internal dividing point of the neighboring binary values of the reference pupil diameter.

The operation of the camera body 1B in this embodiment is performed according to the flowchart of FIGS. 10A and 10B described in the first embodiment, and the routine described in this embodiment is further executed in each step illustrated below.

In the line-of-sight detecting routine in step S103, the control unit 3 refers to the correction coefficient LUT in the memory unit 4 and acquires the correction coefficient according to the above reference routine to a plurality of calibration results. In the processing of reading the first pupil diameter from the memory unit 4 in step S107, the control unit 3 refers to the correction coefficient LUT in the memory unit 4 and reads the first pupil diameter according to the above routine to the plurality of calibration results. In the calibration routine in step S112, the control unit 3 stores the correction coefficient and the first pupil diameter in the correction coefficient LUT in the memory unit 4 according to the above storing routine of a plurality of calibration results.

This embodiment individually stores in the memory unit 4 a plurality of coefficients and the first pupil diameters calculated by calibration performed with different pupil diameters. This embodiment selects any one of the plurality of first pupil diameters, and performs a method for determining whether or not calibration is to be performed again. Therefore, this embodiment can reduce the frequency of performing again calibration as the calibration is performed with different pupil diameters.

Third Embodiment

A description will now be given of a third embodiment. The first embodiment has discussed a method of notifying the user of whether calibration is to be performed again in a case where the pupil diameter is different from that when calibration was performed. The second embodiment has discussed a configuration that individually stores a plurality of coefficients and the first pupil diameters calculated by calibration with different pupil diameters in the memory unit 4. Each of the above embodiments may notify that calibration is to be performed at an unexpected timing during imaging, which may hinder the imaging operation of the user.

Accordingly, in this embodiment, the memory unit 4 previously stores a plurality of pupil diameters (a plurality of recommended pupil diameters) for which calibration is recommended. The control unit 3 notifies the user whether or not calibration is to be performed again, and notifies a recommended pupil diameter for which the calibration has not been performed (of non-execution of calibration). Thereby, the user can predict whether or not calibration is to be performed again, which can be notified later, and the hindrance of the imaging operation due to the notification at an unexpected timing can be reduced. A description will now be given of an example of the method and operation according to this embodiment.

A description will now be given of the recommended pupil diameter for which performing calibration is recommended and which is to be previously stored in the memory unit 4. FIGS. 11A and 11B illustrate correction coefficient LUTs described in the second embodiment. In this embodiment, the pupil diameter recommended for calibration is previously stored in the memory unit 4 in the form of a correction coefficient LUT.

A description will now be given of differences from the correction coefficient LUTs described in the second embodiment. The form of the correction coefficient LUT is similar to that of the second embodiment except for the points described below. FIG. 11C illustrates a correction coefficient LUT stored in the memory unit 4 after calibration is performed only for a pupil diameter of 5.5 [mm]. Unlike FIGS. 11A and 11B, pupil diameters corresponding to idx0 to 5 are recommended pupil diameters for calibration, that is, six recommended pupil diameters are previously stored. Therefore, only correction information corresponding to idx3 has correction information (calibration information) due to calibration that has already been performed. Therefore, for idx 0 to 2 and 4 to 5, only the corresponding correction information has "no information," and for idx 6 to 9, both the corresponding pupil diameter and correction information have "no information." This is a state in which the result of calibration has never been stored. The correction coefficient LUT in the initial state or after initialization processing such as reset is performed behaves differently between idx 0 to 5 and idx 6 to 9. Only the correction information correspond-ing to idx 0 to 5 has all "no information," and the corresponding pupil diameters are not initialized. Pupil diameters and correction information corresponding to idx 6 to 9 have all "no information."

FIG. 12 illustrates a notification screen (LUT_UI) for notifying the user of the correction coefficient LUT. The registration number, pupil diameter, and registration status of LUT_UI correspond to idx, pupil diameter [µm], and correction information of the correction coefficient LUT. That is, the LUT_UI of FIG. 12 indicates that calibration is performed only with the recommended pupil diameter 5500 [µm] of idx 3 corresponding to FIG. 11C, and the calibration is not performed with other recommended pupil diameters.

A triangle drawn to the left of registration number 2 in LUT_UI indicates a target for which calibration is to be performed. That is, as a result of the operation of the camera body 1B to be described below, this indicates that calibration is about to be executed in order to calculate correction information corresponding to registration number 2, that is, idx2 of the correction coefficient LUT. The notification configuration by LUT_UI is an example. For example, as the information on the recommended pupil diameter, instead of the value of the pupil diameter itself, abstract information suggested by the pupil diameter (information that reminds the pupil diameter) may be notified. A specific example may be represented by information suggesting weather or day or night, a small pupil diameter may be represented by words or icons indicating fine weather or daytime, and a large pupil diameter may be represented by words or icons indicating cloudy weather or nighttime.

Figure 13A:
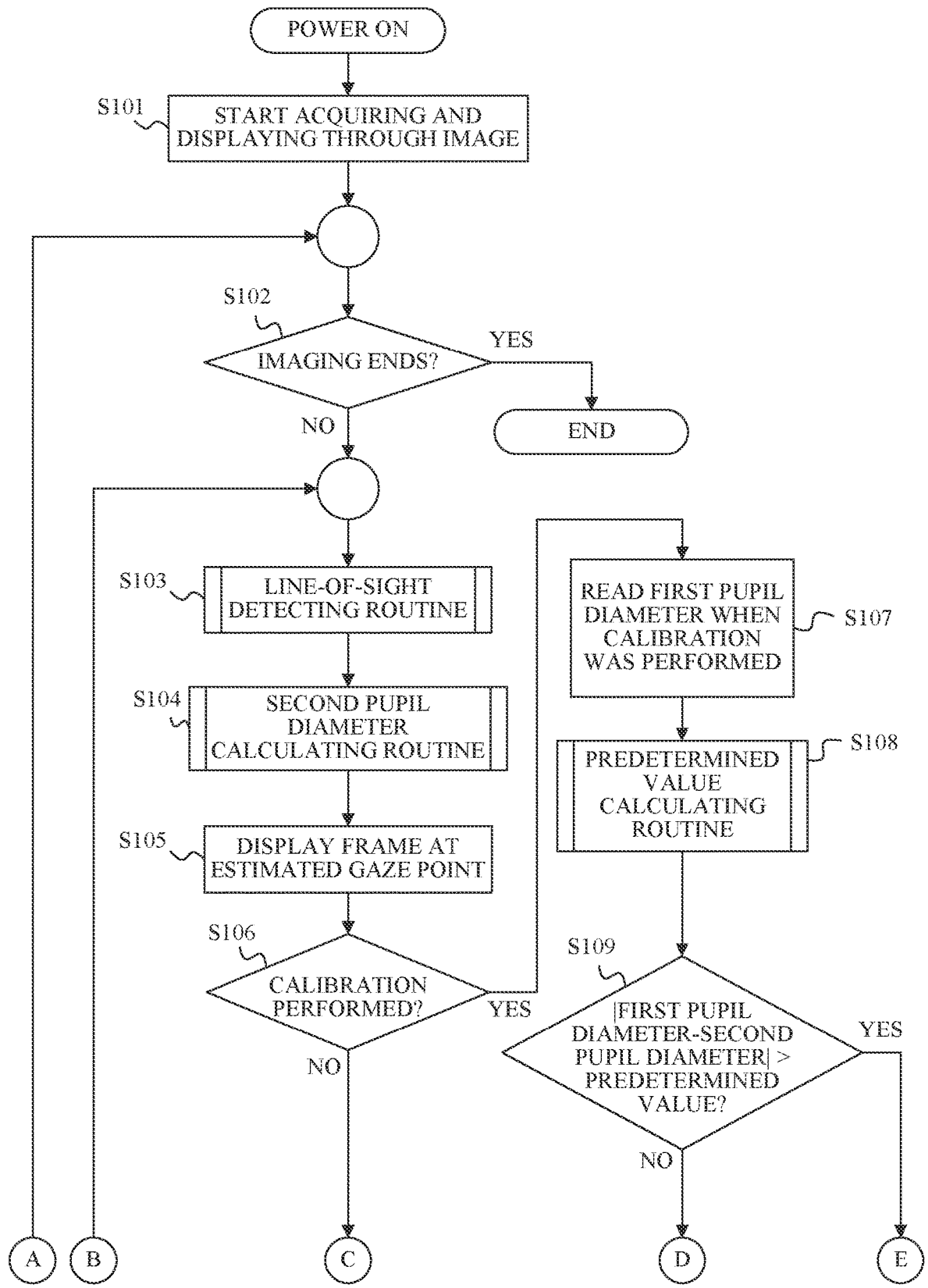
FIGS. 13A and 13B illustrate a flowchart illustrating processing for notifying whether or not calibration is to be performed again in the third embodiment.
Figure 13B:
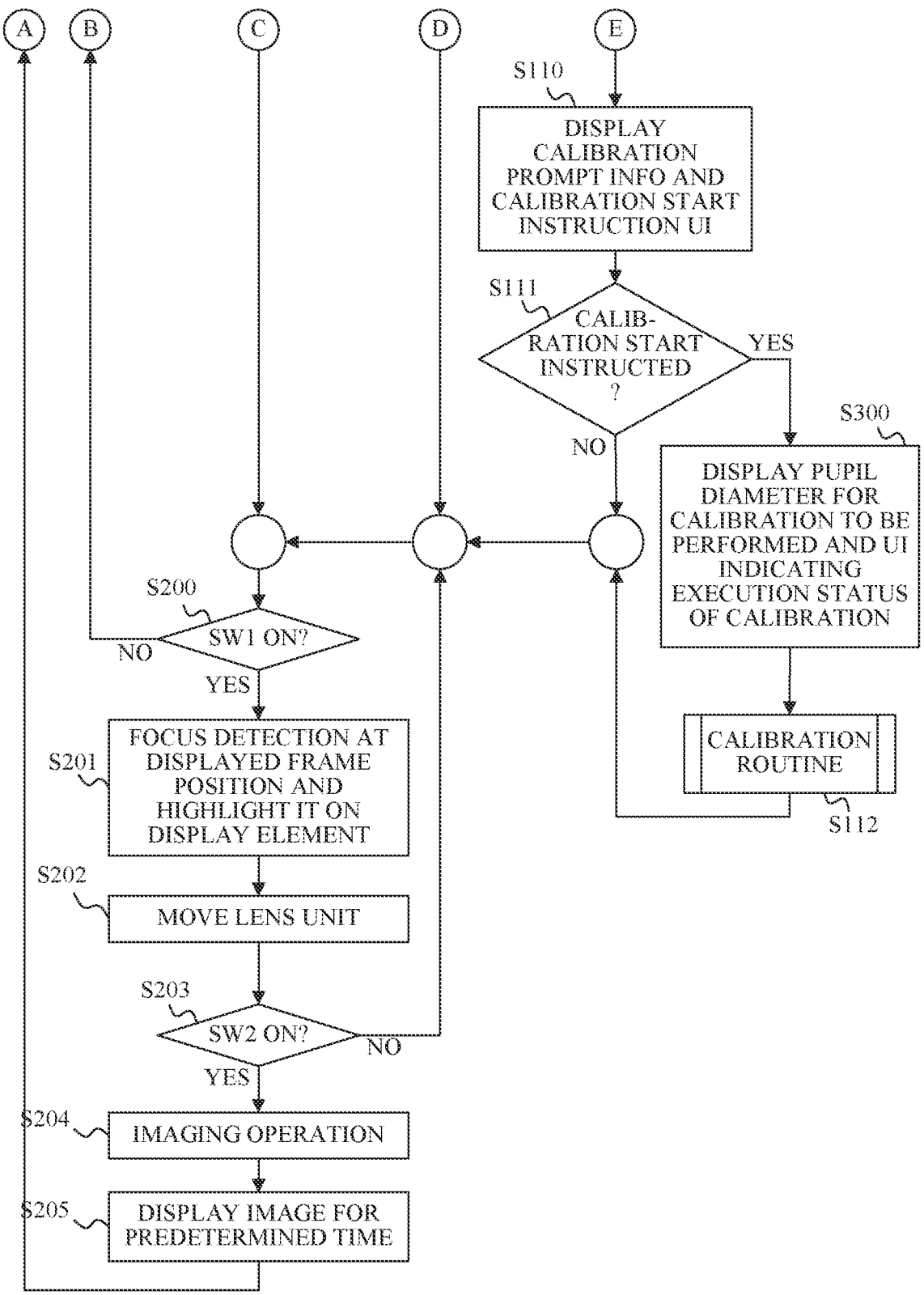

Referring now to FIGS. 13A and 13B, a description will be given of processing of notifying whether or not calibration is to be performed again in this embodiment. FIGS. 13A and 13B illustrate a flowchart illustrating processing of informing whether or not calibration is to be performed again. FIGS. 13A and 13B are different from FIGS. 10A and 10B in that step S300 is added. The other steps in FIGS. 13A and 13B are the same as those in FIGS. 10A and 10B, so a description thereof will be omitted. Step S300 and relating step S111 will be described below.

In step S111, the control unit 3 determines whether or not the user has given an instruction to start calibration. In a case where it is determined that the start of calibration has been instructed, the flow proceeds to step S300. On the other hand, in a case where it is determined that the start of calibration has not been instructed, the flow proceeds to step S200. A calibration start instruction is issued by operating the operation member 43 on the back surface of the camera body 1B as described above.

In step S300, the control unit 3 displays the above LUT_UI on the display element 10. Thereby, the user can be notified of the pupil diameter recommended for calibration (recommended pupil diameter) and the execution status of each calibration, that is, information corresponding to the correction coefficient LUT in this embodiment.

This embodiment previously stores the pupil diameter for which calibration is recommended, and notifies the user whether calibration is to be performed again and a recommended pupil diameter for which calibration has not yet been performed. Thereby, the user can predict whether or not calibration is to be performed again, which will be able to be notified later, so that the hindrance of the imaging operation due to the notification at an unexpected timing can be reduced.

Fourth Embodiment

A description will now be given of a fourth embodiment. The third embodiment previously stores the pupil diameter for which calibration is recommended, and notifies the user whether the calibration is to be performed again and a recommended pupil diameter for which calibration has not yet been performed. Thereby, the user can recognize the execution status of the calibration corresponding to each pupil diameter including the recommended pupil diameter. On the other hand, in order for the user to selectively calibrate with a pupil diameter for which calibration has not yet been calculated, it is necessary to set a pupil diameter to a target size and this work is difficult for the user.

Accordingly, in this embodiment, the user adjusts (changes) the luminance (brightness) of the display element 10 according to the pupil diameter with which calibration is to be performed, thereby adjusting the user's pupil diameter to the pupil diameter (second pupil diameter) with which calibration is to be performed. Thereby, the user can selectively preform calibration for a pupil diameter for which calibration has not yet been performed.

A second pupil diameter is acquired according to the above pupil diameter calculating method. In a case where the acquired second pupil diameter is larger than the pupil diameter for which calibration is to be performed, the display element 10 is made brighter, and the second pupil diameter is acquired again. This processing is repeated until the second pupil diameter becomes the pupil diameter for which calibration is to be performed. In a case where the acquired second pupil diameter is smaller than the pupil diameter for which calibration is to be performed, the inverse operation is performed.

Figure 14:
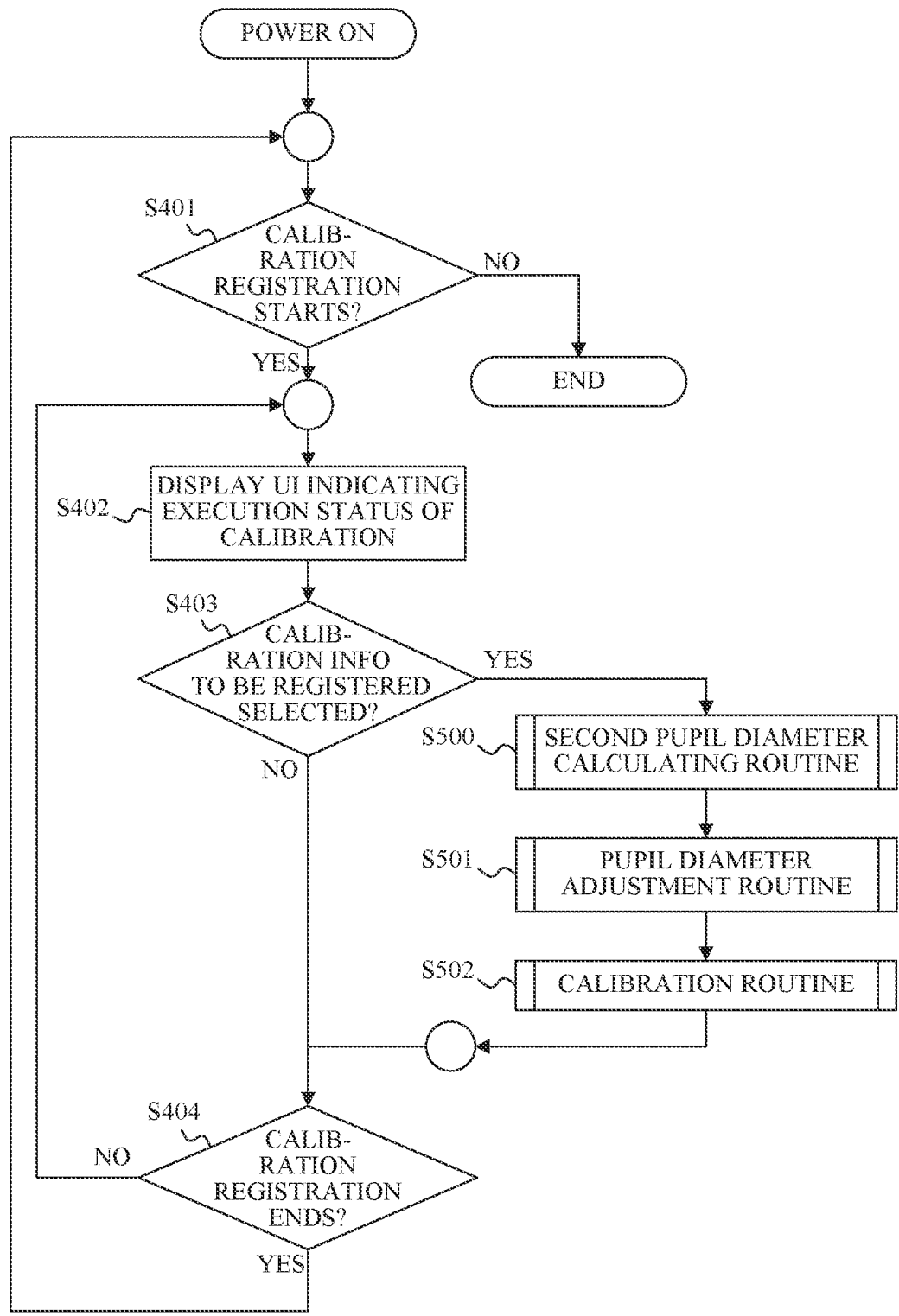
FIG. 14 is a flowchart illustrating pupil diameter adjustment processing according to a fourth embodiment.

Referring now to FIG. 14, a description will be given of pupil diameter adjustment processing according to this embodiment. FIG. 14 is a flowchart illustrating pupil diameter adjustment processing. In a case where the camera body 1B is powered on and the flow is started, the flow proceeds to step S401. In step S401, the control unit 3 determines whether calibration registration has started. In a case where it is determined that the calibration registration has not yet started, this flow ends. On the other hand, in a case where it is determined that the calibration registration has started, the flow proceeds to step S402. In step S402, the control unit 3 displays the above LUT_UI (UI indicating the execution status of calibration) on the display element 10.

Next, in step S403, the control unit 3 determines whether or not calibration information to be registered has been selected. In a case where it is determined that the calibration information to be registered has been selected, the control unit 3 acquires the pupil diameter of the selected calibration information, that is, the first pupil diameter, from the memory unit 4, and flow proceeds to step S500. On the other hand, in a case where it is determined that the calibration information to be registered has not been selected, the flow proceeds to step S404.

In step S500, the control unit 3 executes the above pupil diameter calculating routine. Next, in step S501, the control unit 3 executes the user's pupil diameter adjustment routine described above. Next, in step S502, the control unit 3 performs the above calibration routine, calculates the first pupil diameter according to the above routine for determining whether calibration is to be performed again, and stores it in the memory unit 4. Then, the flow proceeds to step S404. In step S404, the control unit 3 determines whether or not an instruction to end the calibration registration has been given. In a case where it is determined that the end of calibration registration has been instructed, the flow returns to step S401. On the other hand, in a case where it is determined that the end of calibration registration has not been instructed, the flow returns to step S402.

In this embodiment, the processing of notifying whether or not calibration is to be performed again is performed according to the flowchart of FIGS. 10A and 10B corresponding to the first and second embodiments or the flowchart of FIGS. 13A and 13B corresponding to the third embodiment, and the above routine according to this embodiment is further executed.

In the calibration routine of step S112, the control unit 3 executes the above user's pupil diameter adjustment sequence so that the acquired second pupil diameter and the predetermined pupil diameter coincide with each other, and then performs the above calibration routine according to each embodiment. The predetermined pupil diameter is a pupil diameter for which the above calibration is to be performed. This may be one of the recommended pupil diameters described in the third embodiment, but may be different from the recommended pupil diameter. For example, it may be the second pupil diameter that has been used for the above routine for determining whether or not calibration is to be performed again, which is performed in step S109. This case assumes that the second pupil diameter acquired in step S109 and the second pupil diameter acquired in step S112 are different.

This embodiment adjusts the luminance (brightness) of the display element 10 according to the pupil diameter for which the user is to perform calibration, adjusts the pupil diameter of the user to the pupil diameter for which calibration is to be performed. Thereby, the user can selectively perform calibration for a pupil diameter for which calibration has not yet been performed. Thereby, the user can selectively perform calibration for a pupil diameter for which calibration has not yet been performed.

This embodiment can provide a line-of-sight detecting apparatus that can provide highly accurate correction while reducing the burden on the user.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

An example of an image pickup apparatus (digital still camera) has been described in each embodiment, the line-of-sight detecting apparatus of each embodiment may be applied to devices other than the image pickup apparatus. For example, it can be applied as a head-mounted line-of-sight detecting apparatus. In that case, the lens apparatus 1A, the image sensor 2, the display element 10, and the like, which are unique to the image pickup apparatus 1, are omitted, and the eyeball image sensor 17 and the light sources 13a and 13b, which are related to line-of-sight detection, are used for both the left and right eyes.

This application claims the benefit of Japanese Patent Application No. 2022-160515, filed on Oct. 4, 2022, which is hereby incorporated by reference herein in its entirety.

What is claimed is:

1. A line-of-sight detecting apparatus comprising:
a memory storing instructions; and
a processor configured to execute the instructions to:
acquire an estimated gaze point position of a user on a display element based on an eyeball image of the user acquired from an image sensor,
perform calibration for the estimated gaze point position so as to reduce a difference between the estimated gaze point position and an actual gaze point position of the user,
determine whether or not the calibration is to be performed again based on a difference between a first pupil diameter of the user when the calibration was performed and a second pupil diameter of the user when the estimated gaze point position was acquired based on an eyeball image acquired after the calibration,
notify the user of information about performing again the calibration in a case where it is determined that the calibration is to be performed again, and
perform again the calibration in a case where it is determined that the user has instructed to perform again the calibration according to notified information.

2. The line-of-sight detecting apparatus according to claim 1, wherein the processor is configured to determine that the calibration is to be performed again in a case where the processor determines that an absolute value of the difference is larger than a predetermined value.

3. The line-of-sight detecting apparatus according to claim 2, wherein the processor is configured to change the predetermined value based on at least one of the first pupil diameter and the second pupil diameter.

4. The line-of-sight detecting apparatus according to claim 2, wherein the memory stores a plurality of values that are different for each pupil diameter, and
wherein the processor is configured to select the predetermined value from the plurality of values stored in the memory based on at least one of the first pupil diameter or the second pupil diameter.

5. The line-of-sight detecting apparatus according to claim 1, wherein the memory stores a plurality of pupil diameters calculated by the calibration and a plurality of pieces of calibration information in association with each other, and
wherein the processor is configured to select the first pupil diameter from the plurality of pupil diameters stored in the memory based on the second pupil diameter.

6. The line-of-sight detecting apparatus according to claim 5, wherein in a case where the processor determines that the calibration is to be performed again, the processor is configured to notify the user of the information about performing again the calibration,
- wherein the memory previously stores a plurality of recommended pupil diameters with which performing the calibration is recommended, and
- wherein the processor is configured to notify information about a recommended pupil diameter with which the calibration has not been performed, among the plurality of recommended pupil diameters stored in the memory.

7. The line-of-sight detecting apparatus according to claim 6, wherein the information about the recommended pupil diameter is information that reminds one of the recommended pupil diameter.

8. The line-of-sight detecting apparatus according to claim 1, wherein the processor is configured to adjust the second pupil diameter by changing luminance of the display element.

9. The line-of-sight detecting apparatus according to claim 1, wherein the processor is configured to:
- acquire the first pupil diameter from the eyeball image when the calibration was performed, and
- acquire the second pupil diameter from the eyeball image when the estimated gaze point position was acquired.

10. An image pickup apparatus comprising:
- an image sensor; and
- the line-of-sight detecting apparatus according to claim 1.

11. The image pickup apparatus according to claim 10, further comprising a display element configured to display the estimated gaze point position.

12. A line-of-sight detecting method comprising the steps of:
- acquiring an estimated gaze point position of a user on a display element based on an eyeball image of the user acquired from an image sensor;
- performing calibration for the estimated gaze point position so as to reduce a difference between the estimated gaze point position and an actual gaze point position of the user;
- determining whether or not the calibration is to be performed again based on a difference between a first pupil diameter of the user when the calibration was performed and a second pupil diameter of the user when the estimated gaze point position was acquired based on an eyeball image acquired after the calibration;
- notifying the user of information about performing again the calibration in a case where it is determined that the calibration is to be performed again; and
- performing again the calibration in a case where it is determined that the user has instructed to perform again the calibration according to notified information.

13. A non-transitory computer-readable storage medium storing a program that causes a computer to execute the line-of-sight detecting method according to claim 12.

* * * * *